US009571839B2

United States Patent
Alexander

(10) Patent No.: US 9,571,839 B2
(45) Date of Patent: Feb. 14, 2017

(54) IMAGE COMPRESSION AND LOSSLESS RECONSTRUCTION OF DIGITAL IMAGE

(71) Applicant: Brainwave Innovations Private Limited, Bangalore, Karnataka (IN)

(72) Inventor: Rejoy Alexander, Bangalore (IN)

(73) Assignee: Brainwave Innovations Private Limited (IN)

( * ) Notice: Subject to any disclaimer, the term of this patent is extended or adjusted under 35 U.S.C. 154(b) by 0 days.

(21) Appl. No.: 15/068,966

(22) Filed: Mar. 14, 2016

(65) Prior Publication Data

US 2016/0198155 A1 Jul. 7, 2016

Related U.S. Application Data

(63) Continuation of application No. 13/890,535, filed on May 9, 2013, now abandoned.

(30) Foreign Application Priority Data

Jan. 17, 2013 (IN) .............................. 233/CHE/2013

(51) Int. Cl.
*H04N 19/11* (2014.01)
*H04N 19/593* (2014.01)
*G06T 9/00* (2006.01)

(52) U.S. Cl.
CPC ............... *H04N 19/11* (2014.11); *G06T 9/004* (2013.01); *H04N 19/593* (2014.11)

(58) Field of Classification Search
CPC ..................................................... H04N 19/11
USPC .................................................... 375/240.01
See application file for complete search history.

(56) References Cited

U.S. PATENT DOCUMENTS

2006/0262982 A1\* 11/2006 Matsumoto ............ H04N 19/93
382/238
2011/0090956 A1\* 4/2011 Youn ................... H03M 7/4006
375/240.12

\* cited by examiner

*Primary Examiner* — Yulin Sun
(74) *Attorney, Agent, or Firm* — Robert Plotkin, P.C.; Robert Plotkin

(57) ABSTRACT

The present invention is related to a system and method that provides 100% numerically lossless reconstruction of the image as compared from its uncompressed source. The method of the present invention is configured to compress the raw Red-Green-Blue (RGB) data from a digital image stored on a device and the method further comprises the steps of compressing the pixel ($P_c$) only if the RGB component of the pixel ($P_c$) to be compressed is predictable using the RGB component of the neighboring pixels ($P_N$) by using the methods ($m_{01}$-$m_{16}$) else the pixel ($P_c$) is retained.

10 Claims, 18 Drawing Sheets

| $P_2$ | $P_3$ | $P_4$ |
|---|---|---|
| $P_1$ | $P_C$ | |
| | | |

FIG 1

IMAGE COMPRESSION AND LOSSLESS RECONSTRUCTION OF DIGITAL IMAGE

BACKGROUND

Digital images, video technology are an essential and inherent part of the present day. Application of digital images, video technology in mobile and hand-held devices and over internet is immense. Most of the industries such as entertainment industry with animation and live action requirement, defense, broadcasting, medical imaging, surveillance, astronomy, robotics and computer graphics require soaring high on quality and performance with ever demanding needs of lossless image compression technique.

Existing professional video players provide a way to playback sequence of images or video from a compressed source which is lossy. Playing a sequence of uncompressed hi-resolution image-frames requires large RAM capacity. Commercially available hard-disk speed is not sufficient to transfer enormous amount of image data to the computer. For a 2K (2048×1024) image sequence of 800 frames, one would require 5033164800 Bytes (4.6875 GB) of RAM to playback 33.33 seconds of smooth playback at lossless quality. Hence there is a need of a system that provides lossless compression technique that allows the end user to be able to seamlessly playback video without frame-count limitations and thereby overcoming the constraint on RAM.

Hence what is needed is a compression/decompression method that provides 100% numerically lossless reconstruction of the image as compared from its uncompressed source and also the decompression system that should be extremely fast so as to read the compressed image data [and decompress] at 24 FPS losslessly.

SUMMARY

The present invention relates to a system and method for image compression and is particularly related to 100% numerically lossless reconstruction of the digital image.

The present invention relates to a system and method that provides 100% numerically lossless reconstruction of the image as compared to its uncompressed source. For this purpose, the method in accordance to one or more embodiment of the present invention compresses the pixel ($P_c$), only if the RGB component of the pixel ($P_c$) to be compressed is predictable using the RGB components of the neighboring pixels ($P_N$) by using any one of the methods ($m_{01}$-$m_{16}$).

In accordance to one or more embodiment of the present invention, the method that compresses the Red-Green-Blue (RGB) data from a digital image comprises the steps of identifying the pixel ($P_c$) to be compressed, identifying the neighboring pixels ($P_N$) preceding the pixel ($P_c$) to be compressed wherein the neighboring pixels ($P_N$) are taken within a cycle of four reference neighboring pixels preceding the pixel ($P_c$) to be compressed. The method further comprises the steps of checking if the RGB component of the pixel ($P_c$) to be compressed is predictable using the RGB component of the neighboring pixels ($P_N$) by using any one of the methods ($m_{01}$-$m_{16}$) and compressing the pixel ($P_c$) only if the RGB component of the pixel ($P_c$) to be compressed is predictable using the RGB component of the neighboring pixels ($P_N$) else retaining the pixel ($P_c$) if the RGB component of the pixel ($P_c$) is not predictable using the RGB component of the neighboring pixels.

In accordance to one or more embodiment of the present invention, the method of the present invention may be implemented on any personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod. RTM , a video player, a DVD writer/player, a television and a home entertainment system.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

FIG. 1 illustrates the method of identifying the neighboring pixels ($P_N$) preceding the pixel ($P_c$) to be compressed in accordance to one embodiment of the invention.

FIG. 2l illustrates the compression method $m_{12}$ of the present invention in detail for compressing the digital image in accordance to one embodiment of the present invention.

DETAILED DESCRIPTION

Figure 2:
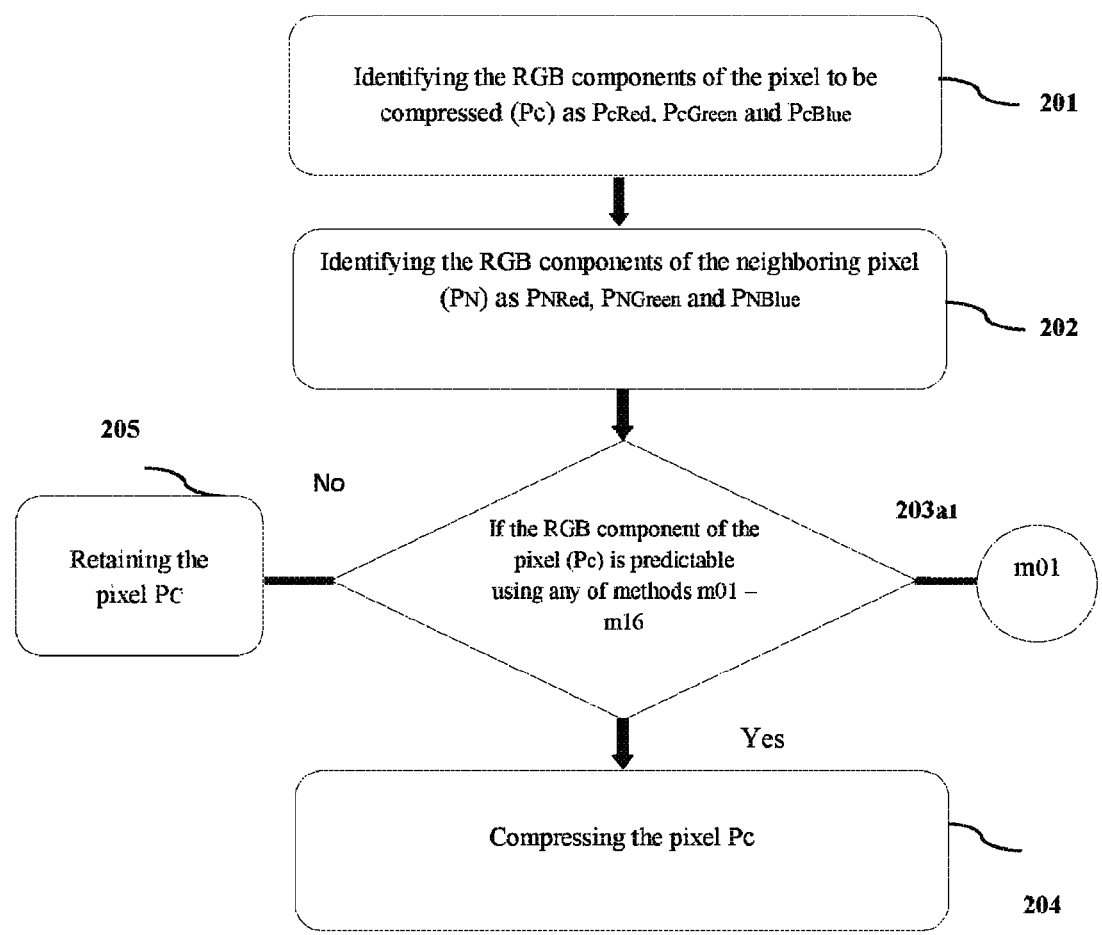
FIG. 2 illustrates the method of compressing a digital image in accordance to one embodiment of the invention.

The present invention overcomes the drawback of prior art by providing a system and method that provides 100% numerically lossless reconstruction of the image as compared from its uncompressed source.

The term '$P_c$' is used herein to represent any pixel to be compressed and the term '$P_{cRed}$, $P_{cBlue}$ and $P_{cGreen}$' is used herein to represent the Red, Blue and Green component of the pixel '$P_c$' to be compressed.

The term '$P_N$' is used herein to represent the neighboring pixels preceding the pixel ($P_c$) to be compressed and the neighboring pixels ($P_N$) are taken within a cycle of four reference neighboring pixels ('$P_1$, $P_2$, $P_3$ and $P_4$') preceding the pixel ($P_c$) to be compressed.

The term '$P_{NRed}$, $P_{NGreen}$ and $P_{NBlue}$' is used herein to represent the Red, Green and Blue components of the neighboring pixel '$P_N$'.

The term 'Neighbor Map' is used herein to represent the bit wise binary representation of each neighboring pixel '$P_N$' that is used for predicting the RGB component of the pixel '$P_c$' to be compressed. For instance, the bit wise binary representation of ('$P_1$, $P_2$, $P_3$ and $P_4$) is as follows:
  $P_1$—00
  $P_2$—01
  $P_3$—10
  $P_4$—11

The term '$P_{ind}$' is used herein to represent the index values of the neighboring pixels '$P_N$'. The index value of the neighboring pixels is as follows:
  $P_{ind1}$—1
  $P_{ind2}$—2
  $P_{ind3}$—3
  $P_{ind4}$—4

The term 'method map' is used herein to represent the bit wise binary representation of method ($m_{01}$-$m_{16}$) denoting how each pixel '$P_c$' is related to its neighboring pixel '$P_N$'. The bit wise binary representation of the methods ($m_{01}$-$m_{16}$) is as follows:
  $m_{01}$—0000
  $m_{02}$—0001
  $m_{03}$—0010
  $m_{04}$—0011
  $m_{05}$—0100
  $m_{06}$—0101
  $m_{07}$—0110
  $m_{08}$—0111
  $m_{09}$—1000
  $m_{10}$—1001
  $m_{11}$—1010
  $m_{12}$—1011
  $m_{13}$—1100
  $m_{14}$—1101
  $m_{15}$—1110
  $m_{16}$—1111

The term 'component difference map' is used herein to represent the bit wise binary representation of the difference between the RGB components of the pixel ($P_c$) to be compressed and the RGB components of the neighboring pixels ($P_N$). The bit wise binary representation of the component difference map is as follows:
  $D_{01}$—000
  $D_{02}$—000
  $D_{03}$—001
  $D_{04}$—001
  $D_{05}$—010
  $D_{06}$—010
  $D_{07}$—011
  $D_{08}$—111

The term 'sign bit map' is used herein to represent the bit wise binary representation of the difference between the comparisons, whether the comparison is positive or negative. If the result of the comparison is positive, the sign bit map is updated to one, else the sign bit map is updated to zero.

Figure 1:
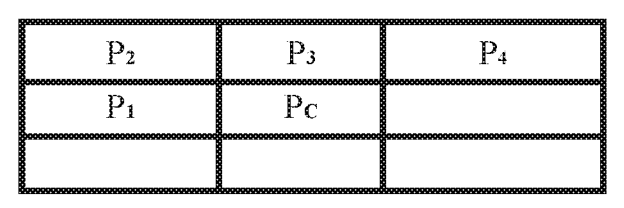

FIG. 1 illustrates the method of identifying the neighboring pixels ($P_N$) preceding the pixel ($P_c$) to be compressed in accordance to one embodiment of the invention. For each pixel ($P_c$) to be compressed, neighboring pixels ($P_N$) are taken within a cycle of four reference neighboring pixels preceding the pixel ($P_c$) to be compressed. As shown in FIG. 1 for each pixel ($P_c$) to be compressed, four neighboring pixels ($P_1$, $P_2$, $P_3$ and $P_4$) are identified preceding the pixel ($P_c$) to be compressed.

FIG. 2 illustrates the compression method configured for compressing a digital image in accordance to one embodiment of the present invention. The compression method for compressing a digital image acquired/stored in the device comprises the steps of identifying the RGB components of the pixel ($P_c$) to be compressed as $P_{cRed}$, $P_{cGreen}$ and $P_{cBlue}$ (wherein $P_{cRed}$ is the red component of the pixel ($P_c$) to be compressed, $P_{cGreen}$ is the green component of the pixel ($P_c$) to be compressed and $P_{cBlue}$ is the blue component of the pixel ($P_c$) to be compressed) in step 201, identifying the RGB components of the neighboring pixels ($P_N$) preceding the pixel ($P_c$) to be compressed as $P_{NRed}$, $P_{NGreen}$ and $P_{NBlue}$ (as shown in FIG. 1, wherein $P_{NRed}$ is the red component of the neighboring pixel of ($P_c$) to be compressed, $P_{NGreen}$ is the green component of the neighboring pixel of ($P_c$) to be compressed and $P_{NBlue}$ is the blue component of the neighboring pixel of ($P_c$) to be compressed,) in step 202. In step 203, checking if the RGB component of the pixel ($P_c$) to be compressed is predictable using the RGB component of the neighboring pixels ($P_N$) by using any one of the methods ($m_{01}$-$m_{16}$) (here the control is transferred to step 203a1 in FIG. 2a to step 203a75 in FIG. 2p to check if the RGB components of the pixel ($P_c$) to be compressed is predictable using the RGB components of the neighboring pixels ($P_N$) by using any one of the methods ($m_{01}$-$m_{16}$)) and compressing the pixel ($P_c$) in step 204 if the RGB component of the pixel ($P_c$) to be compressed is predictable using the RGB components of the neighboring pixels by using any one of the methods ($m_{01}$-$m_{16}$) else retaining the pixel ($P_c$) in step 205 if the RGB component of the pixel ($P_c$) is not predictable by using any one of the methods $m_{01}$-$m_{16}$.

Figure 2A:
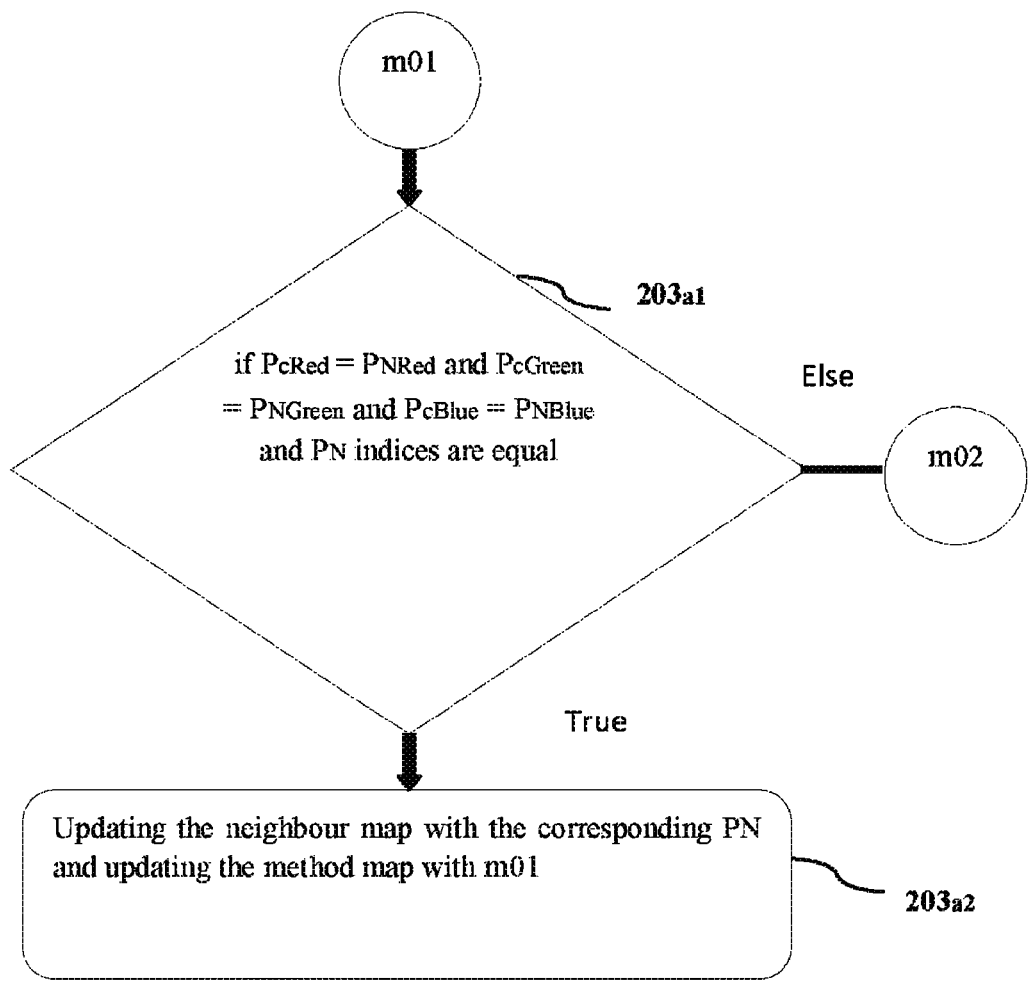
FIG. 2a illustrates the compression method $m_{01}$ of the present invention in detail for compressing the digital image in accordance to one embodiment of the present invention.

FIG. 2a illustrates the compression method $m_{01}$ of the present invention in detail for compressing the digital image in accordance to one embodiment of the present invention. The compression method $m_{01}$ for compressing a digital image further comprises the steps of checking if $P_{cRed}$=$P_{NRed}$ and $P_{cGreen}$=$P_{NGreen}$ and $P_{cBlue}$=$P_{NBlue}$ and the indices of the neighboring pixels ($P_N$) are equal in step 203a1 (therefore only two bits is used for identifying the neighboring pixel ($P_N$) for all the RGB components that matches the condition in step 203a1) then updating the neighbor map with corresponding neighboring pixel ($P_N$) (binary value of the neighbor pixel ($P_N$) is added to the neighbor map), and updating the method map with method $m_{01}$ (binary value of method $m_{01}$ (0000) is added to the method map) in step 203a2, else transferring the control to step 203a3 in FIG. 2b (here the control is transferred to step 203a3 to check if the RGB component of the pixel $P_c$ to be compressed is predictable using method $m_{02}$).

Figure 2B:
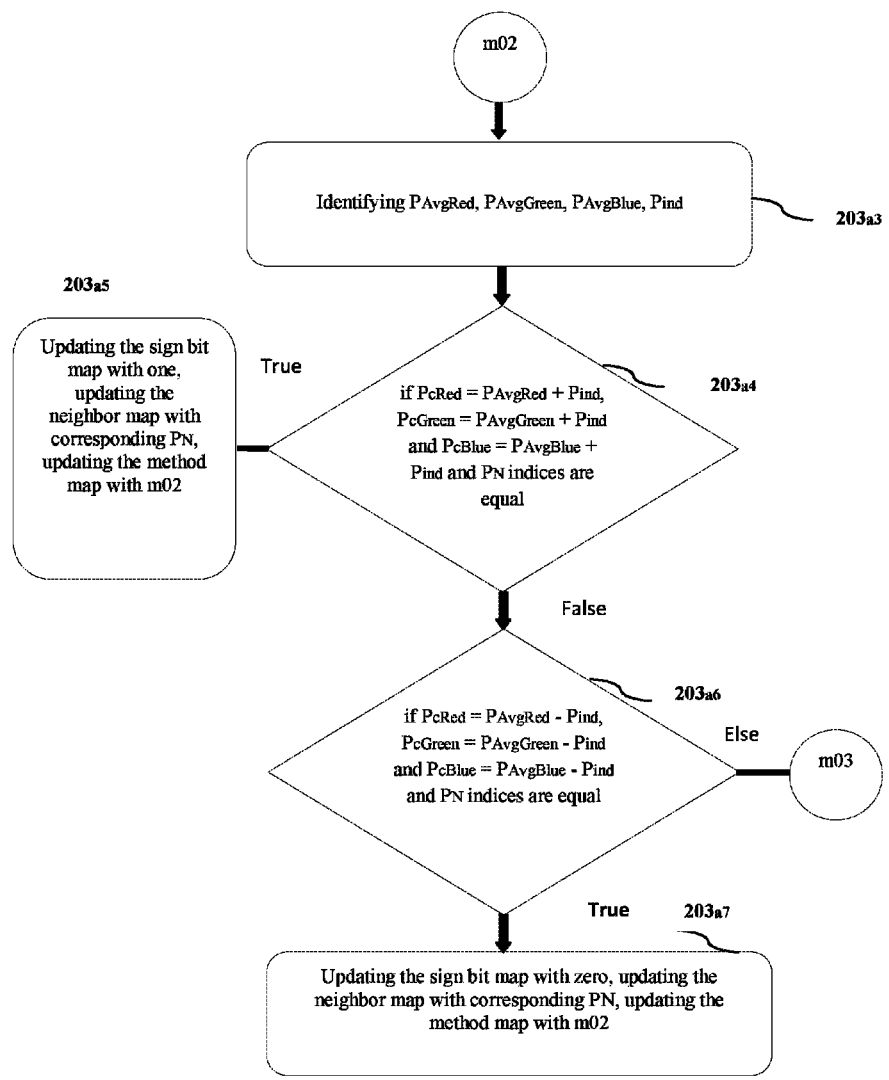
FIG. 2b illustrates the compression method $m_{02}$ of the present invention in detail for compressing the digital image in accordance to one embodiment of the present invention.

FIG. 2b illustrates the compression method $m_{02}$ of the present invention in detail for compressing the digital image in accordance to one embodiment of the present invention. The compression method $m_{02}$ for compressing a digital image further comprises the steps of identifying $P_{AvgRed}$, $P_{AvgGreen}$, $P_{AvgBlue}$, $P_{ind}$ in step 203a3, wherein $P_{AvgRed}$, $P_{AvgGreen}$, $P_{AvgBlue}$ are calculated as $P_{AvgRed}$=average of the red component of the neighboring pixels ($P_N$) and $P_{PrevRed}$ (wherein $P_{PrevRed}$ is the red component of the previous pixel of $P_N$ along the horizontal scan line), $P_{AvgGreen}$=average of the green component of the neighboring pixels ($P_N$) and $P_{PrevGreen}$ (wherein $P_{PrevGreen}$ is the green component of the previous pixel of ($P_N$) along the horizontal scan-line), $P_{AvgBlue}$=average of the blue component of the neighboring pixels ($P_N$) and $P_{PrevBlue}$ (wherein $P_{PrevBlue}$ is the blue component of the previous pixel of ($P_N$) along the horizontal scan-line) and $P_{ind}$=index value of the neighboring pixels ($P_N$).

In step 203a4 checking if $P_{cRed}=P_{AvgRed}+P_{ind}$, $P_{cGreen}=P_{AvgGreen}+P_{ind}$ and $P_{cBlue}=P_{AvgBlue}+P_{ind}$ and the indices of the neighboring pixels ($P_N$) are equal (therefore only two bits is used for identifying the neighbor pixel for all the RGB components that matches the condition in step 203a4) then updating the sign bit map with one (here the sign bit map is updated with one to denote the sum of the average and index value), updating the neighbor map with the corresponding neighboring pixel ($P_N$) and updating the method map with method ($m_{02}$) (binary value of method $m_{02}$ (0001) is added to the method map) in step 203a5. Else checking if $P_{cRed}=P_{AvgRed}-P_{ind}$, $P_{cGreen}=P_{AvgGreen}-P_{ind}$ and $P_{cBlue}=P_{AvgBlue}-P_{ind}$ and the indices of the neighboring pixels ($P_N$) are equal in step 203a6 (therefore only two bits is used for identifying the neighbor pixel for all the RGB components that matches the condition in step 203a6) and if the condition holds true updating the sign bit element with zero, updating the neighbor map with the corresponding neighboring pixel ($P_N$) and updating the method map with method $m_{02}$ (binary value of method $m_{02}$ (0001) is added to the method map) in step 203a7, else the control is transferred to step 203a8 in FIG. 2c (here the control is transferred to step 203a8 to check if the RGB component of the pixel $P_c$ to be compressed is predictable using method $m_{03}$).

Figure 2C:
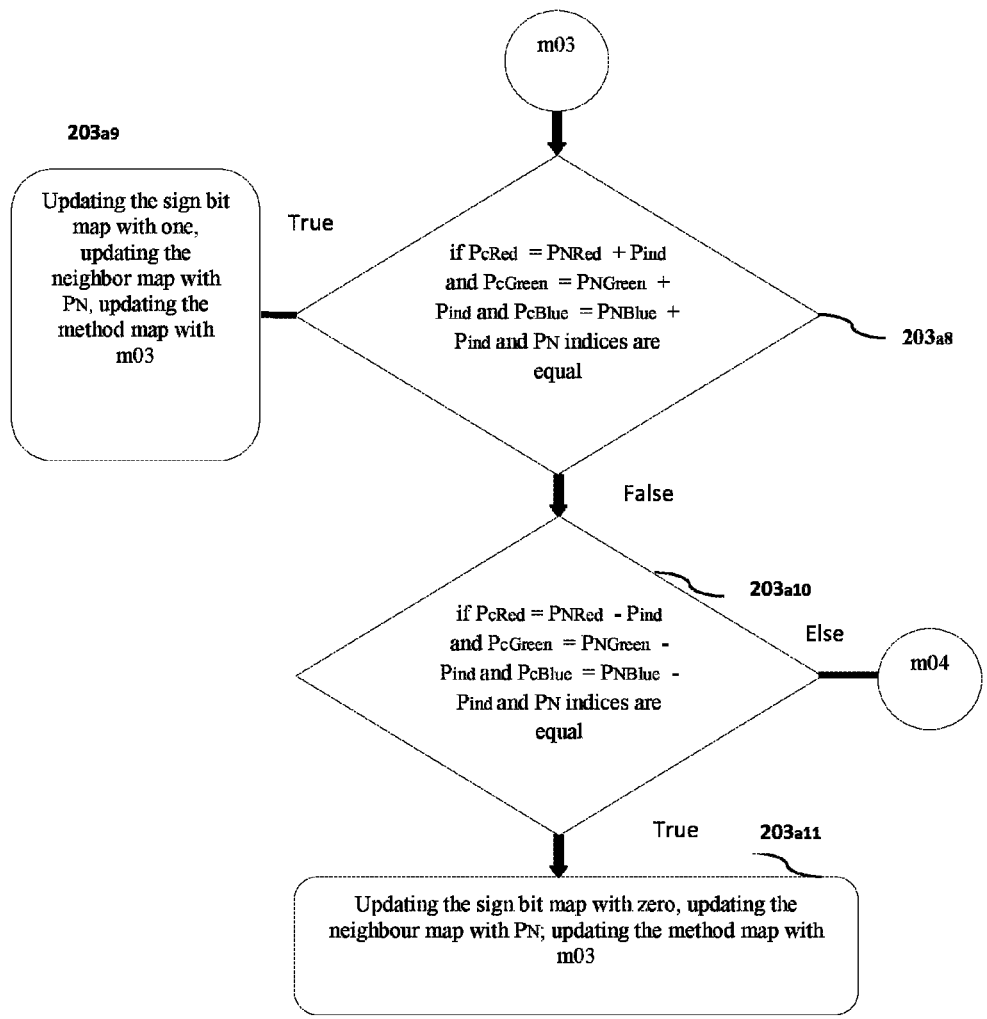
FIG. 2c illustrates the compression method $m_{03}$ of the present invention in detail for compressing the digital image in accordance to one embodiment of the present invention.

FIG. 2c illustrates the compression method $m_{03}$ of the present invention in detail for compressing the digital image in accordance to one embodiment of the present invention. The compression method $m_{03}$ for compressing a digital image further comprises the steps of checking if $P_{cRed}=P_{NRed}+P_{ind}$ and $P_{cGreen}=P_{NGreen}+P_{ind}$ and $P_{cBlue}=P_{NBlue}+P_{ind}$ and the indices of the neighboring pixels ($P_N$) are equal in step 203a8 (since the indices of the neighboring pixels ($P_N$) are equal, therefore only two bits is used for identifying the neighbor pixel for all the RGB components that matches the condition in step 203a8), then updating the sign bit map with one (here the sign bit map is updated with one to denote the sum between the RGB components of the neighboring reference pixel $P_N$ and its index value), updating the neighbor map with the corresponding neighboring pixel ($P_N$), updating the method map with method 3 ($m_{03}$) in step 203a9.

If the condition as discussed in step 203a8 holds false then checking if $P_{cRed}=P_{NRed}-P_{ind}$ and $P_{cGreen}=P_{NGreen}-P_{ind}$ and $P_{cBlue}=P_{NBlue}-P_{ind}$ and the indices of the neighboring pixels ($P_N$) are equal (therefore only two bits is used for identifying the neighbor pixel for all the RGB components that matches the condition in step 203a10) in step 203a10, then updating the sign bit map with zero (here the sign bit map is updated with zero to denote the difference between the RGB components of the neighboring reference pixel $P_N$ and its index value), updating the neighbor map with the corresponding neighboring pixel ($P_N$), updating the method map with method ($m_{03}$) (binary value of method $m_{03}$ (0010) is added to the method map) in step 203a11. If the condition as discussed in step 203a10 holds false the control is transferred to step 203a12 in FIG. 2d (here the control is transferred to step 203a12 to check if the RGB component of the pixel $P_c$ to be compressed is predictable using method $m_{04}$).

Figure 2D:
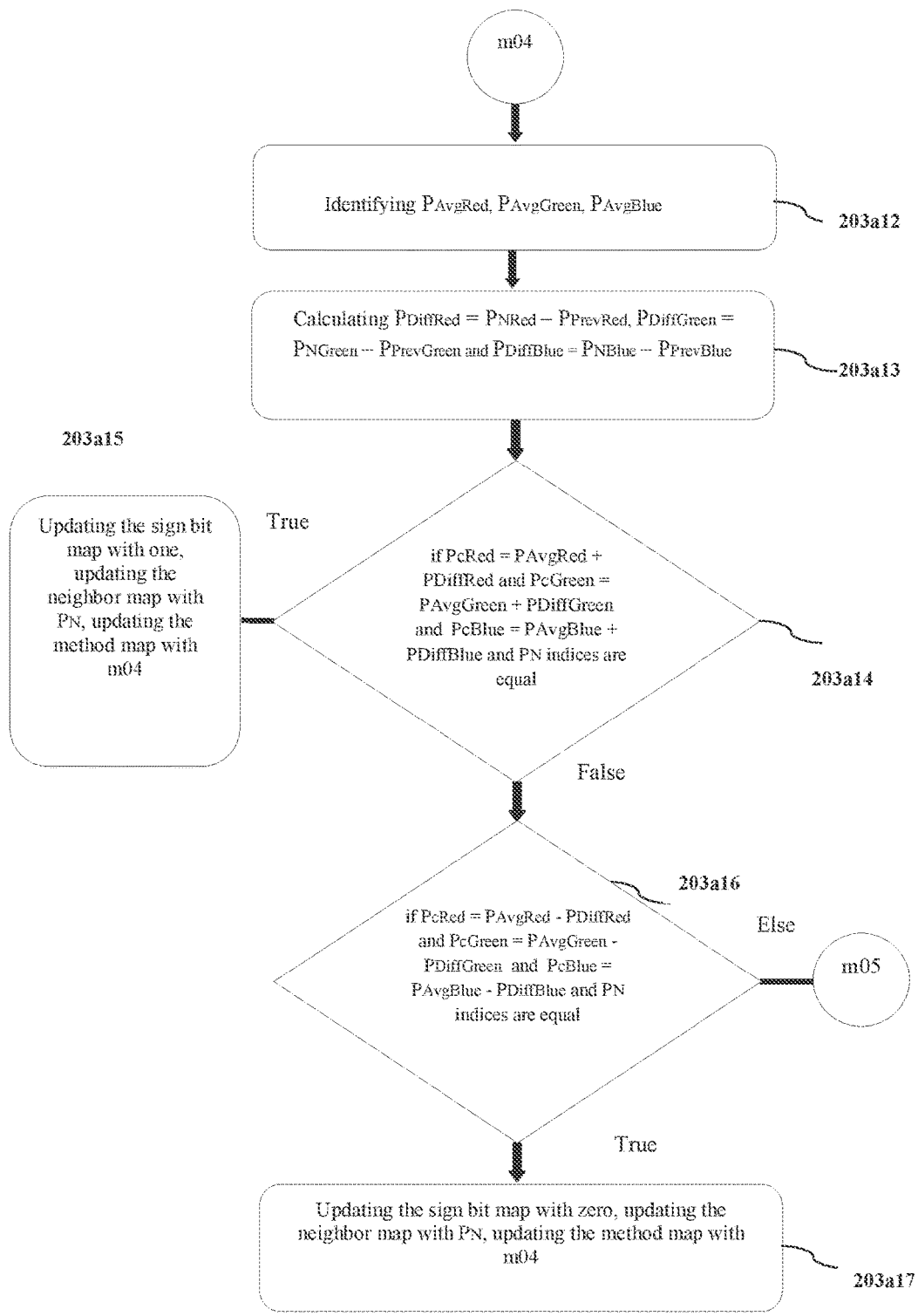
FIG. 2d illustrates the compression method $m_{04}$ of the present invention in detail for compressing the digital image in accordance to one embodiment of the present invention.

FIG. 2d illustrates the compression method $m_{04}$ of the present invention in detail for compressing the digital image in accordance to one embodiment of the present invention. The compression method ($m_{04}$) for compressing a digital image further comprises the steps of identifying $P_{AvgRed}$, $P_{AvgGreen}$, $P_{AvgBlue}$ in step 203a12 wherein $P_{AvgRed}$=average of the red component of the neighboring pixels ($P_N$) and $P_{PrevRed}$ (wherein $P_{PrevRed}$ is the red component of the previous pixel of $P_N$ along the horizontal scan line), $P_{AvgGreen}$=average of the green component of the neighboring pixels ($P_N$) and $P_{PrevGreen}$ (wherein $P_{PrevGreen}$ is the green component of the previous pixel of ($P_N$) along the horizontal scan-line), $P_{AvgBlue}$=average of the blue component of the neighboring pixels ($P_N$) and $P_{PrevBlue}$ (wherein $P_{PrevBlue}$ is the blue component of the previous pixel of ($P_N$) along the horizontal scan-line).

Calculating $P_{DiffRed}$, $P_{DiffGreen}$ and $P_{DiffBlue}$ in step 203a13, wherein:

$$P_{DiffRed}=P_{NRed}-P_{PrevRed};$$

$$P_{DiffGreen}=P_{NGreen}-P_{PrevGreen};$$

$$P_{DiffBlue}=P_{NBlue}-P_{PrevBlue}.$$

In step 203a14, checking if $P_{cRed}=P_{AvgRed}+P_{DiffRed}$ and $P_{cGreen}=P_{AvgGreen}+P_{DiffGreen}$ and $P_{cBlue}=P_{AvgBlue}+P_{DiffBlue}$ and the indices of the neighboring pixels ($P_N$) are equal (therefore only two bits is used for identifying the neighbor pixel for all the RGB components that matches the condition in step 203a14) and if the condition holds true in step 203a14 updating the sign bit element with one (here the sign bit element is updated with one to denote the sum of the average and difference value), updating the method map with method ($m_{04}$) (binary value of method $m_{04}$ (0011) is added to the method map) and updating the neighbor map with the corresponding neighboring pixel ($P_N$) that matches the above condition in step 203a15. Else if the condition holds false in step 203a14, checking if $P_{cRed}=P_{AvgRed}-P_{DiffRed}$ and $P_{cGreen}=P_{AvgGreen}-P_{DiffGreen}$ and $P_{cBlue}=P_{AvgBlue}-P_{DiffBlue}$ and the indices of the neighboring pixels ($P_N$) are equal (therefore only two bits is used for identifying the neighbor pixel for all the RGB components that matches the condition in step 203a16) in step 203a16 and if the condition holds true in step 203a16 then updating the sign bit map with zero (here the sign bit element is updated with zero to denote the differences between the Average and difference value), updating the neighbor map with the corresponding neighboring pixel ($P_N$) and updating the method map with method ($m_{04}$) (binary value of method $m_{04}$ (0011) is added to the method map) in step 203a17, else the control is transferred to step 203a18 in FIG. 2e (here the control is transferred to step 203a18 to check if the RGB component of the pixel $P_c$ to be compressed is predictable using method $m_{05}$).

Figure 2E:
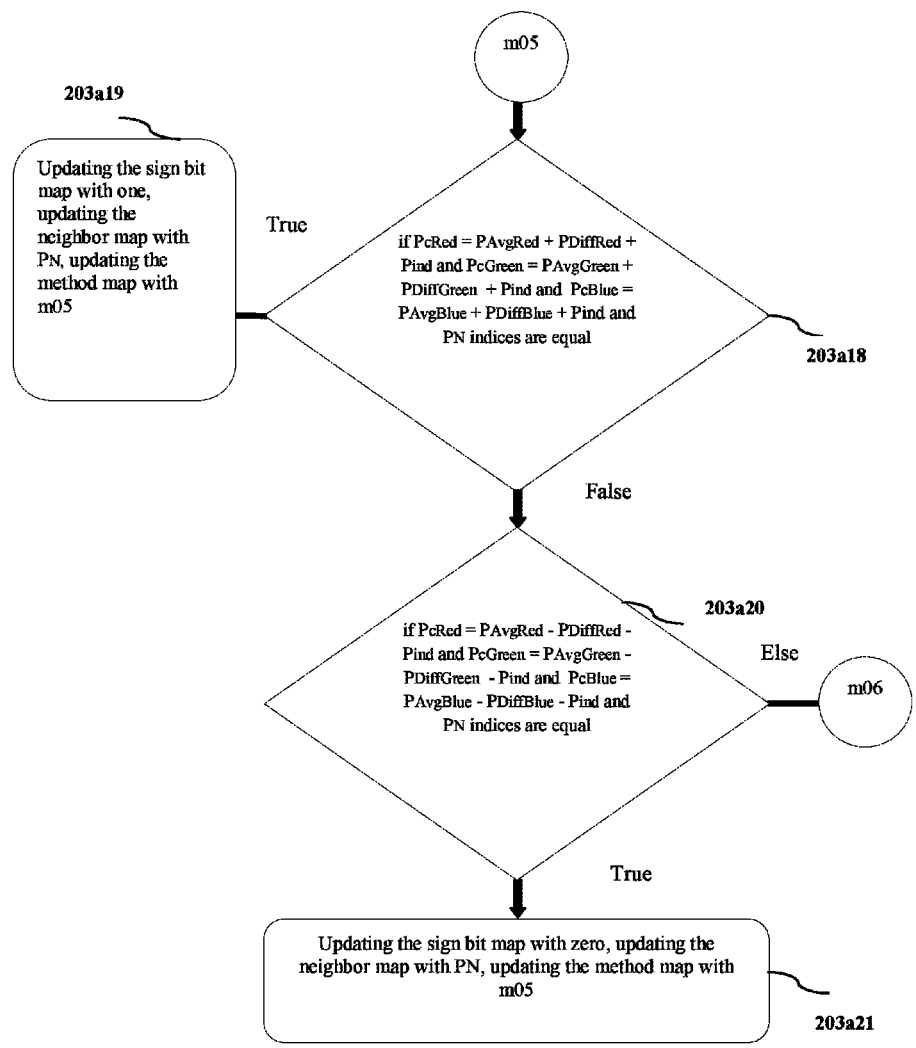
FIG. 2e illustrates the compression method $m_{05}$ of the present invention in detail for compressing the digital image in accordance to one embodiment of the present invention.

FIG. 2e illustrates the compression method $m_{05}$ of the present invention in detail for compressing the digital image in accordance to one embodiment of the present invention. The compression method ($m_{05}$) for compressing a digital image further comprises the steps of checking if $P_{cRed}=P_{AvgRed}+P_{DiffRed}+P_{ind}$ and $P_{cGreen}=P_{AvgGreen}+P_{DiffGreen}+P_{ind}$ and $P_{cBlue}=P_{AvgBlue}+P_{DiffBlue}+P_{ind}$ and the indices of the neighboring pixels ($P_N$) are equal (therefore only two bits is used for identifying the neighboring pixel for all the RGB components that matches the condition in step 203a18) and if the condition holds true in step 203a18, updating the sign bit map with one (here the sign bit element is updated with one to denote the sum of Average, Index Value and the difference value), updating the neighbor map with the corresponding $P_N$ and updating the method map with $m_{05}$ (binary value of method $m_{05}$ (0100) is added to the method map) in step 203a19.

Else if the condition holds false in step 203a18, checking if $P_{cRed}=P_{AvgRed}-P_{DiffRed}-P_{ind}$ and $P_{cGreen}=P_{AvgGreen}-P_{DiffGreen}-P_{ind}$ and $P_{cBlue}=P_{AvgBlue}-P_{DiffBlue}-P_{ind}$ and the indices of the neighboring pixels $P_N$ are equal (therefore only two bits is used for identifying the neighbor pixel for all the RGB components that matches the condition in step 203a20) in step 203a20 and updating the sign bit map with zero (here the sign bit element is updated with zero to denote the difference between the Average, Index Value and the difference value), updating the neighbor map with the corresponding neighboring pixel $P_N$ and updating the method map with method 5 ($m_{05}$) (binary value of method $m_{05}$ (0100) is added to the method map) in step 203a21. Else if the condition holds false in step 203a20, the control is transferred to step 203a22 in FIG. 2f (here the control is transferred to step 203a22 to check if the RGB component of the pixel $P_c$ to be compressed is predictable using method $m_{06}$).

Figure 2F:
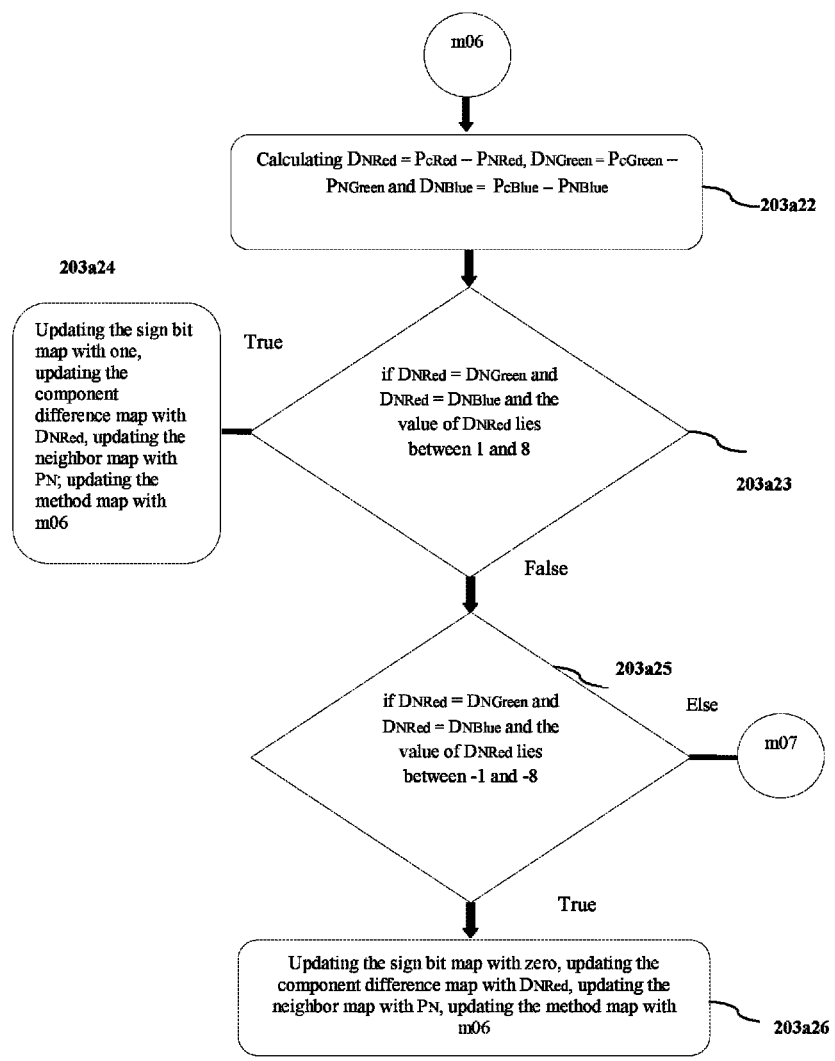
FIG. 2f illustrates the compression method $m_{06}$ of the present invention in detail for compressing the digital image in accordance to one embodiment of the present invention.

FIG. 2f illustrates the compression method $m_{06}$ of the present invention in detail for compressing the digital image in accordance to one embodiment of the present invention. The compression method $m_{06}$ for compressing a digital image further comprises the steps of calculating $D_{NRed}$, $D_{NGreen}$ and $D_{NBlue}$ in step 203a22, wherein:

$D_{NRed}=P_{cRed}-P_{NRed}$;

$D_{NGreen}=P_{cGreen}-P_{NGreen}$;

$D_{NBlue}=P_{cBlue}-P_{NBlue}$.

In step 203a23, checking if $D_{NRed}=D_{NGreen}$ and $D_{NRed}=D_{NBlue}$ and the value of $D_{NRed}$ lies between 1 and 8 and if the condition in step 203a23 holds true then updating the sign bit map with one (here the sign bit map is updated with one to denote the difference as positive), updating the component difference map with $D_{NRed}$, updating the neighbor map with the corresponding neighboring pixel ($P_N$) and updating the method map with method ($m_{06}$) (binary value of method $m_{06}$ (0101) is added to the method map) in step 203a24.

Else if the condition holds false in step 203a23, checking if $D_{NRed}=D_{NGreen}$ and $D_{NRed}=D_{NBlue}$ and the value of $D_{NRed}$ lies between −1 and −8 in step 230 and if the condition holds true in step 203a25, updating the sign bit map with zero (here the sign bit element is updated with one to denote the difference as negative), updating the component difference map with $D_{NRed}$, updating the neighbor map with the corresponding neighboring pixel ($P_N$) and updating the method map with method ($m_{06}$) (binary value of method $m_{06}$ (0101) is added to the method map) in step 203a26. Else if the condition holds false in step 203a25, the control is transferred to the step 203a27 in FIG. 2g (here the control is transferred to step 203a27 to check if the RGB component of the pixel $P_c$ to be compressed is predictable using method $m_{07}$).

Figure 2G:
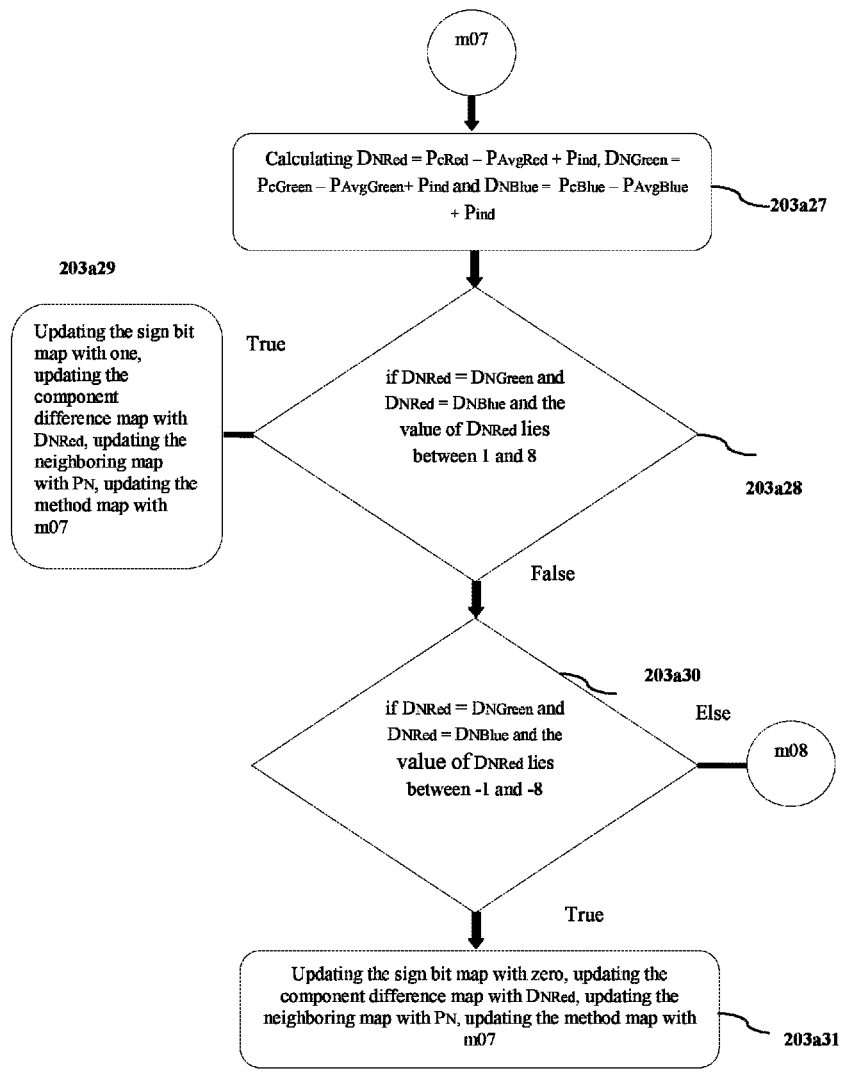
FIG. 2g illustrates the compression method $m_{07}$ of the present invention in detail for compressing the digital image in accordance to one embodiment of the present invention.

FIG. 2g illustrates the compression method $m_{07}$ of the present invention in detail for compressing the digital image in accordance to one embodiment of the present invention. The compression method $m_{07}$ for compressing a digital image further comprises the steps of calculating $D_{NRed}$, $D_{NGreen}$ and $D_{NBlue}$ in step 203a27, wherein:

$D_{NRed}=P_{cRed}-P_{AvgRed}+P_{ind}$;

$D_{NGreen}=P_{cGreen}-P_{AvgGreen}+P_{ind}$;

$D_{NBlue}=P_{cBlue}-P_{AvgBlue}+P_{ind}$.

In step 203a28, checking if $D_{NRed}=D_{NGreen}$ and $D_{NRed}=D_{NBlue}$ and the value of $D_{NRed}$ lies between 1 and 8 and if the condition in step 203a28 holds true then updating the sign bit map with one (here the sign bit map is updated with one to denote the difference as positive), updating the component difference map with $D_{NRed}$, updating the neighbor map with the corresponding neighboring pixel ($P_N$) and updating the method map with method ($m_{07}$), binary value of method $m_{07}$ (0110) is added to the method map) in step 203a29.

Else if the condition holds false in step 203a28, checking if $D_{NRed}=D_{NGreen}$ and $D_{NRed}=D_{NBlue}$ and the value of $D_{NRed}$ lies between −1 and −8 in step 203a30 and if the condition holds true in step 203a30, updating the sign bit element with zero (here the sign bit element is updated with zero to denote the difference as negative), updating the component difference map with $D_{NRed}$, updating the neighbor map with the corresponding neighboring pixel ($P_N$) and updating the method map with method ($m_{07}$) in step 203a31. Else if the condition holds false in step 203a30, then the control is transferred to the step 203a32 in FIG. 2h (here the control is transferred to step 203a32 to check if the RGB component of the pixel $P_c$ to be compressed is predictable using method $m_{08}$).

Figure 2H:
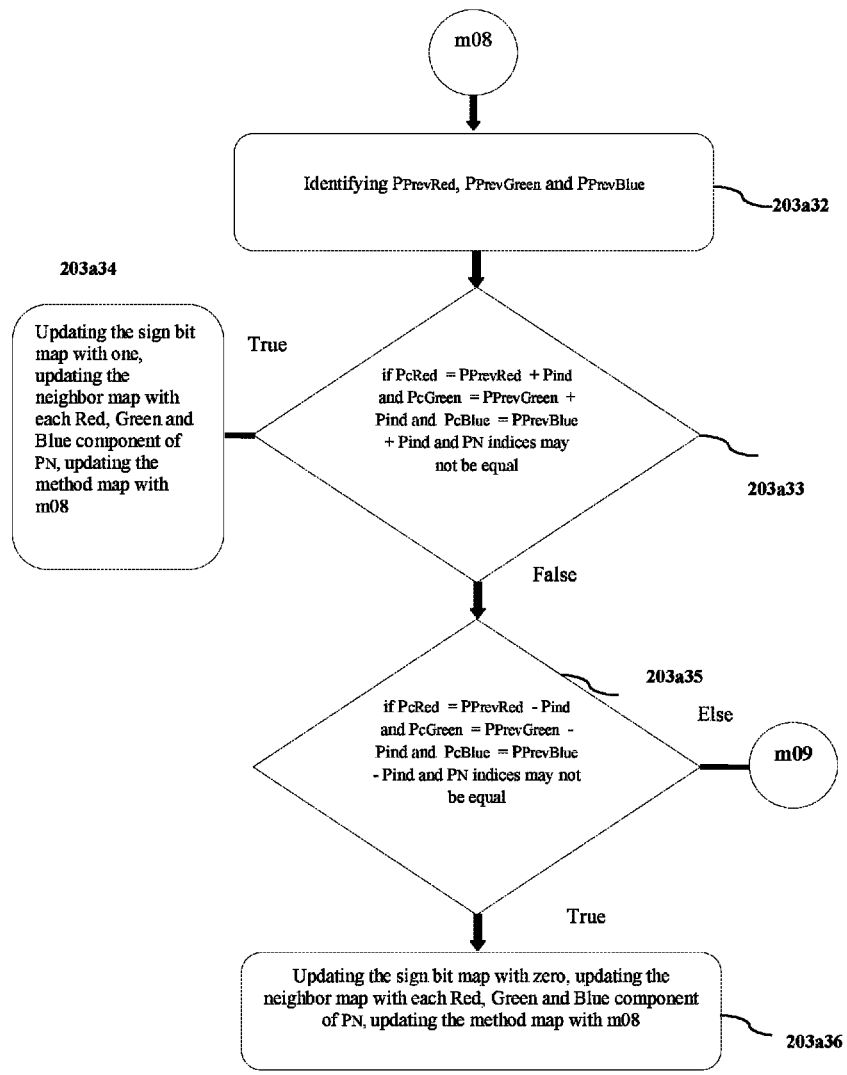
FIG. 2h illustrates the compression method $m_{08}$ of the present invention in detail for compressing the digital image in accordance to one embodiment of the present invention.

FIG. 2h illustrates the compression method $m_{08}$ of the present invention in detail for compressing the digital image in accordance to one embodiment of the present invention. The compression method $m_{08}$ for compressing a digital image further comprises the steps of identifying $P_{PrevRed}$, $P_{PrevGreen}$ and $P_{PrevBlue}$ in step 203a32, wherein:

$P_{PrevRed}$=red component of the previous pixel of $P_N$ along the horizontal scan line;

$P_{PrevBlue}$=blue component of the previous pixel of $P_N$ along the horizontal scan line;

$P_{PrevGreen}$=green component of the previous pixel of $P_N$ along the horizontal scan line.

In step 203a33, checking if $P_{CRed}=P_{PrevRed}+P_{ind}$ and $P_{CGreen}=P_{PrevGreen}+P_{ind}$ and $P_{CBlue}=P_{PrevBlue}+P_{ind}$ and the indices of the neighboring pixels ($P_N$) may not be equal (therefore 2 Bits for identifying each component of the neighbor pixel for each RG&B components which matches the condition in step 203a33), then updating the sign bit map with one (here the sign bit map is updated with one to denote the difference as positive), updating the neighbor map with each Red, Green and Blue component of the neighboring pixel ($P_N$) and updating the method map with method $m_{08}$ (binary value of method $m_{08}$ (0111) is added to the method map) in step 203a34.

Else if the condition holds false in step 203a33, checking if $P_{CRed}=P_{PrevRed}-P_{ind}$ and $P_{CGreen}=P_{PrevGreen}-P_{ind}$ and $P_{CBlue}=P_{PrevBlue}-P_{ind}$ and the indices of the neighboring pixels $P_N$ may not be equal in step 203a35 (therefore 2 bits for identifying each component of the neighbor pixel for each RG&B components which matches the condition in step 203a35) and then updating the sign bit map with zero (here the sign bit map is updated with one to denote the difference as positive), updating the neighbor map with each Red, Green and Blue component of the neighboring pixel ($P_N$) (that holds true for the condition in step 203a35) and updating the method map with method $m_{08}$ (binary value of method $m_{08}$ (0111) is added to the method map) in step 203a36.

Figure 2I:
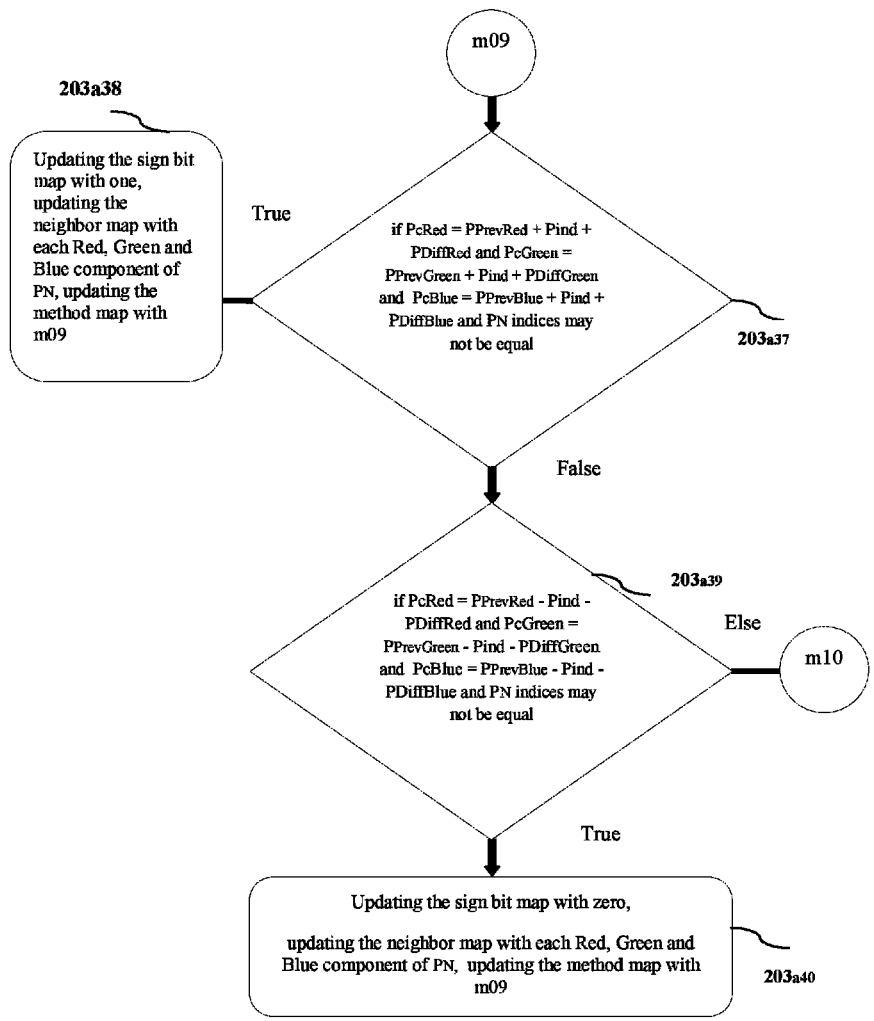
FIG. 2i illustrates the compression method $m_{09}$ of the present invention in detail for compressing the digital image in accordance to one embodiment of the present invention.

Else if the condition holds false in step 203a35, the control is transferred to the step 203a37 in FIG. 2i (here the control is transferred to step 203a37 to check if the RGB component of the pixel $P_c$ to be compressed is predictable using method $m_{09}$).

FIG. 2i illustrates the compression method $m_{09}$ of the present invention in detail for compressing the digital image in accordance to one embodiment of the present invention. The compression method ($m_{09}$) for compressing a digital image further comprises the steps of checking if $P_{cRed}=P_{PrevRed}+P_{ind}+P_{DiffRed}$ and $P_{CGreen}=P_{PrevGreen}+P_{ind}+P_{DiffGreen}$ and $P_{CBlue}=P_{PrevBlue}+P_{ind}+P_{DiffBlue}$ and the indices of the neighboring pixels $P_N$ may not be equal in step 203a37 (therefore 2 Bits for identifying each component of the neighbor pixel for each RG&B components which matches the condition in step 203a37) then updating the sign bit element with one (here the sign bit map is updated with one to denote the sum between Previous Pixel of the current pixel and the Index value and the sum of difference), updating the neighbor map with each Red, Green and Blue component of the neighboring pixel ($P_N$) and updating the method map with method $m_{09}$ (binary value of method $m_{09}$ (1000) is added to the method map) in step 203a38. Else checking if $P_{cRed}=P_{PrevRed}-P_{ind}-P_{DiffRed}$ and $P_{cGreen}=P_{PrevGreen}-P_{ind}-P_{DiffGreen}$ and $P_{cBlue}=P_{PrevBlue}-P_{ind}-P_{DiffBlue}$ and the indices of neighboring pixels identifying each Red, Green and Blue component may not be equal in step 203a39 and updating the sign bit map with zero (here the sign bit map is updated with zero to denote the difference between Previous Pixel of the current pixel and the Index value and the sum of difference), updating the neighbor map with each Red, Green and Blue component of the neighboring pixel ($P_N$) and updating the method map with method $m_{09}$ (binary value of method $m_{09}$ (1000) is added to the method map) in step 203a40. Else if the condition holds false in step 203a39, the control is transferred to the step 203a41 in FIG. 2j (here the control is transferred to step 203a41 to check if the RGB component of the pixel $P_c$ to be compressed is predictable using method $m_{10}$).

Figure 2J:
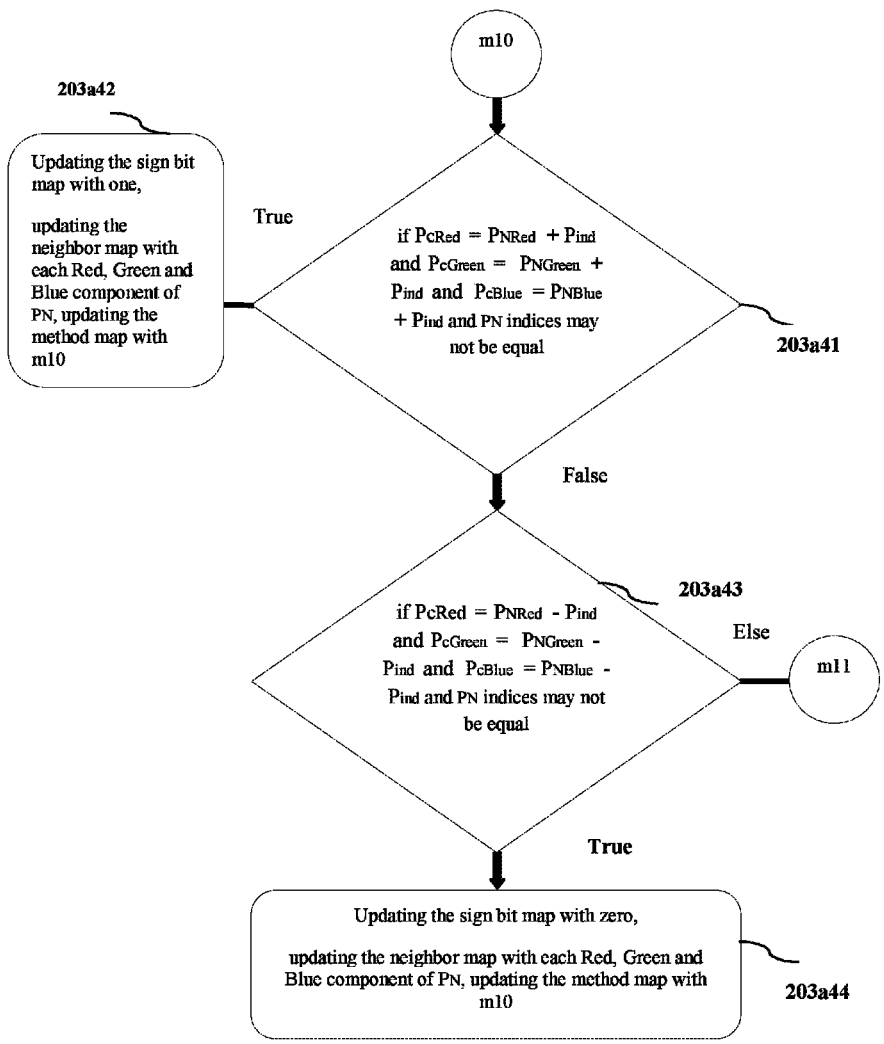
FIG. 2j illustrates the compression method $m_{10}$ of the present invention in detail for compressing the digital image in accordance to one embodiment of the present invention.

FIG. 2j illustrates the compression method $m_{10}$ of the present invention in detail for compressing the digital image in accordance to one embodiment of the present invention. The compression method $m_{10}$ for compressing a digital image further comprises the steps of checking if $P_{cRed}=P_{NRed}+P_{ind}$ and $P_{cGreen}=P_{NGreen}+P_{ind}$ and $P_{cBlue}=P_{NBlue}+P_{ind}$ and the indices of the neighboring pixels ($P_N$) may not be equal in step 203a41 (therefore 2 Bits for identifying each component of the neighbor pixel for each RG&B components which matches the condition in step 203a41) then updating the sign bit map with one (here the sign bit element is updated with one to denote the sum between neighboring Pixel and the Index value), updating the neighbor map with each Red, Green and Blue component of the neighboring pixel ($P_N$), updating the method map with method $m_{10}$ (binary value of method $m_{10}$ (1001) is added to the method map) in step 203a42. Else if the condition in step 203a41 holds false, checking if $P_{cRed}=P_{NRed}-P_{ind}$ and $P_{cGreen}=P_{NGreen}-P_{ind}$ and $P_{cBlue}=P_{NBlue}-P_{ind}$ and the indices of the neighboring pixels may not be equal in step 203a43 (therefore 2 Bits for identifying each component of the neighbor pixel for each RG&B components which matches the condition in step 203a43) then updating the sign bit element with zero (here the sign bit element is updated with zero to denote the sum between neighboring Pixel and the Index value), updating the neighbor map with each Red, Green and Blue component of the neighboring pixel ($P_N$) and updating the method map with method $m_{10}$ (binary value of method $m_{10}$ (1001) is added to the method map) in step 203a44. If the condition holds false in step 203a43, the control is transferred to the step 203a45 in FIG. 2k (here the control is transferred to step 203a45 to check if the RGB component of the pixel $P_c$ to be compressed is predictable using method $m_{11}$).

Figure 2K:
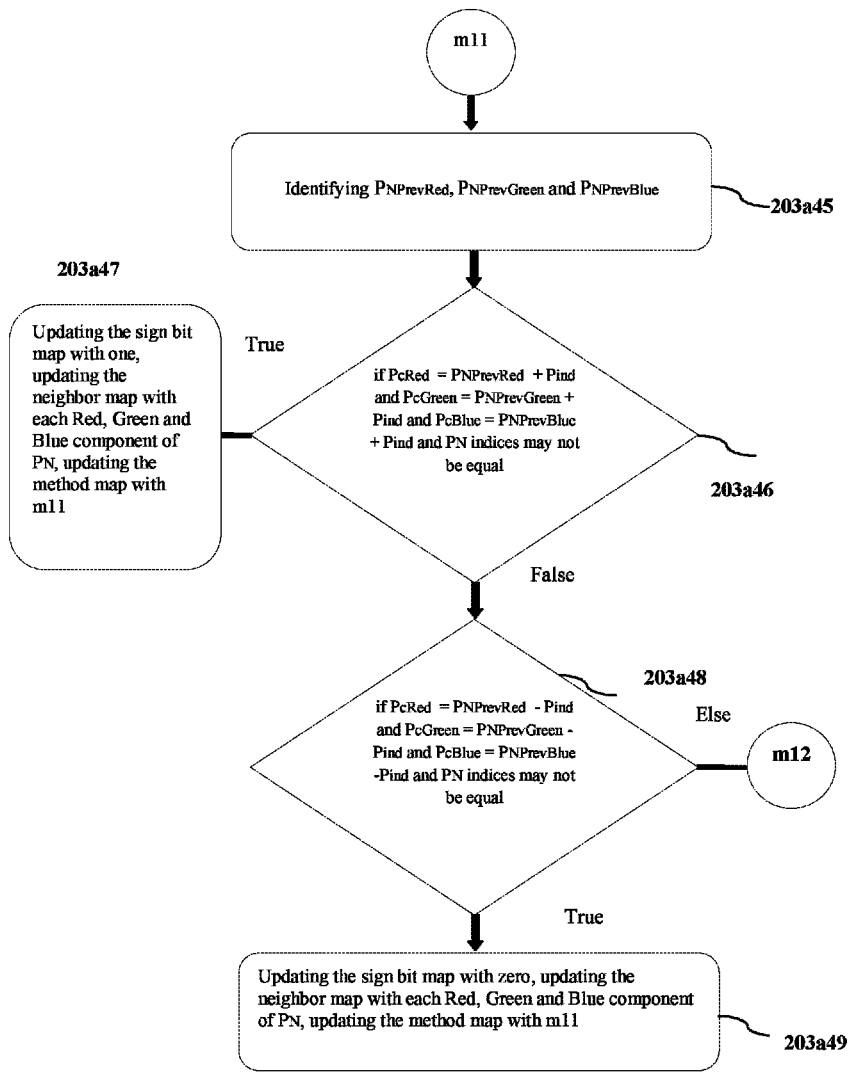
FIG. 2k illustrates the compression method $m_{11}$ of the present invention in detail for compressing the digital image in accordance to one embodiment of the present invention.
Figure 21:
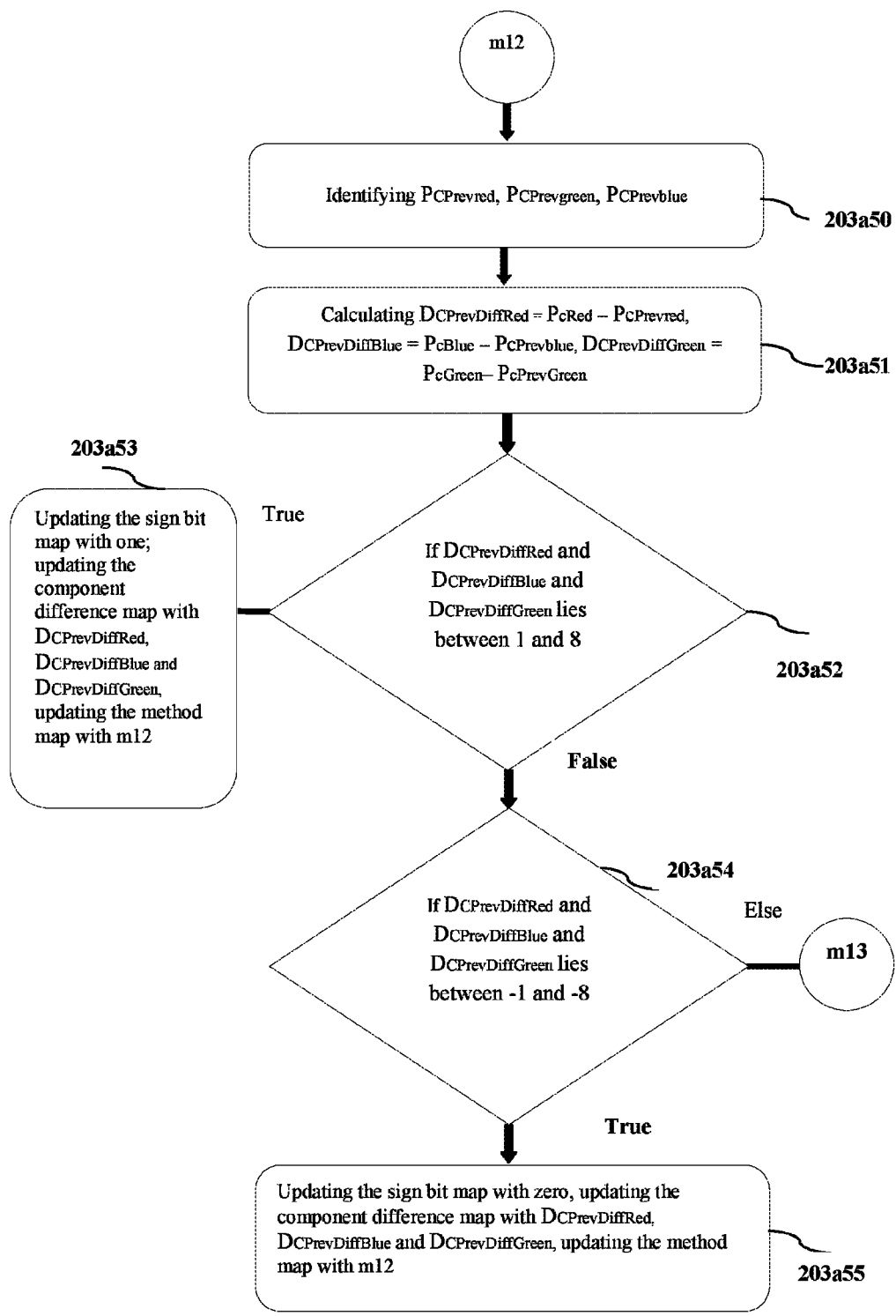

FIG. 2k illustrates the compression method $m_{11}$ of the present invention in detail for compressing the digital image in accordance to one embodiment of the present invention. The compression method ($m_{11}$) for compressing a digital image further comprises the steps of identifying $P_{NPrevRed}$, $P_{NPrevGreen}$ and $P_{NPrevBlue}$ in step 203a45 wherein:

$$P_{NPrevRed}=P_{(NRed-Pind)};$$

$$P_{NPrevGreen}=P_{(NGreen-Pind)};$$

$$P_{NPrevBlue}=P_{(NBlue-Pind)}.$$

In step 203a46, checking if $P_{cRed}=P_{NPrevRed}+P_{ind}$ and $P_{cGreen}=P_{NPrevGreen}+P_{ind}$ and $P_{cBlue}=P_{NPrevBlue}+P_{ind}$ and the indices of the neighboring pixels ($P_N$) may not be equal (therefore 2 Bits for identifying each component of the neighbor pixel for each RG&B components which matches the condition in step 203a46) then updating the sign bit map with one (here the sign bit map is updated with one to denote the sum between the previous pixels of the neighboring Pixel and the index value), updating the neighbor map with each Red, Green and Blue component of the neighboring pixel ($P_N$) and updating the method map with method $m_{11}$ (binary value of method $m_{11}$ (1010) is added to the method map) in step 203a47. If the condition in step 203a46 holds false then further checking if $P_{cRed}=P_{NPrevRed}-P_{ind}$ and $P_{cGreen}=P_{NPrevGreen}-P_{ind}$ and $P_{CBlue}=P_{NPrevBlue}-P_{ind}$ and the indices of the neighboring pixels ($P_N$) may not be equal (therefore 2 Bits for identifying each component of the neighbor pixel for each RG&B components which matches the condition in step 203a48) in step 203a48 and then updating the sign bit element with zero updating the neighbor map with each Red, Green and Blue component of the neighboring pixel ($P_N$) and updating the method map with method $m_{11}$ in step 203a49. Else transferring the control to step 203a50 in FIG. 2l, (here the control is transferred to step 203a50 to check if the RGB component of the pixel $P_c$ to be compressed is predictable using method $m_{12}$).

FIG. 2l illustrates the compression method $m_{12}$ of the present invention in detail for compressing the digital image in accordance to one embodiment of the present invention. The compression method $m_{12}$ for compressing a digital image further comprises the steps of identifying $P_{CPrevred}$, $P_{CPrevgreen}$, $P_{CPrevblue}$ in step 203a50 wherein:

$P_{CPrevred}$=red component of the previous pixel of $P_c$;

$P_{CPrevgreen}$=green component of the previous pixel of $P_c$;

$P_{CPrevblue}$=blue component of the previous pixel of $P_c$.

In step 203a51, calculating $D_{CPrevDiffRed}$, $D_{CPrevDiffBlue}$ and $D_{CPrevDiffGreen}$, wherein:

$D_{CPrevDiffRed}=P_{cRed}-P_{CPrevred}$;

$D_{CPrevDiffBlue}=P_{cBlue}-P_{CPrevblue}$;

$D_{CPrevDiffGreen}=P_{cGreen}-P_{cPrevGreen}$.

Checking if $D_{CPrevDiffRed}$, $D_{CPrevDiffBlue}$ and $D_{CPrevDiffGreen}$ lies between 1 and 8 in step 203a52 and updating the sign bit map to one (here the sign bit map is updated with one to denote the differences in step 256 is positive), updating the component difference map with $D_{CPrevDiffRed}$, $D_{CPrevDiffBlue}$ and $D_{CPrevDiffGreen}$, updating the method map with method $m_{12}$ (binary value of method $m_{12}$ (1011) is added to the method map) in step 203a53. If the condition in step 203a52 holds false then checking if $D_{CPrevDiffRed}$, $D_{CPrevDiffBlue}$ and $D_{CPrevDiffGreen}$ lies between −1 and −8 in step 203a54 and then updating the updating the sign bit element to zero, updating the component difference map with $D_{CPrevDiffRed}$, $D_{CPrevDiffBlue}$ and $D_{CPrevDiffGreen}$, updating the method map with method $m_{12}$ (binary value of method $m_{12}$ (1011) is added to the method map) in step 203a55 if the condition in step 203a54 holds true else the control is transferred to step 203a56 in FIG. 2m (here the control is transferred to step 203a56 to check if the RGB component of the pixel $P_c$ to be compressed is predictable using method $m_{13}$).

Figure 2M:
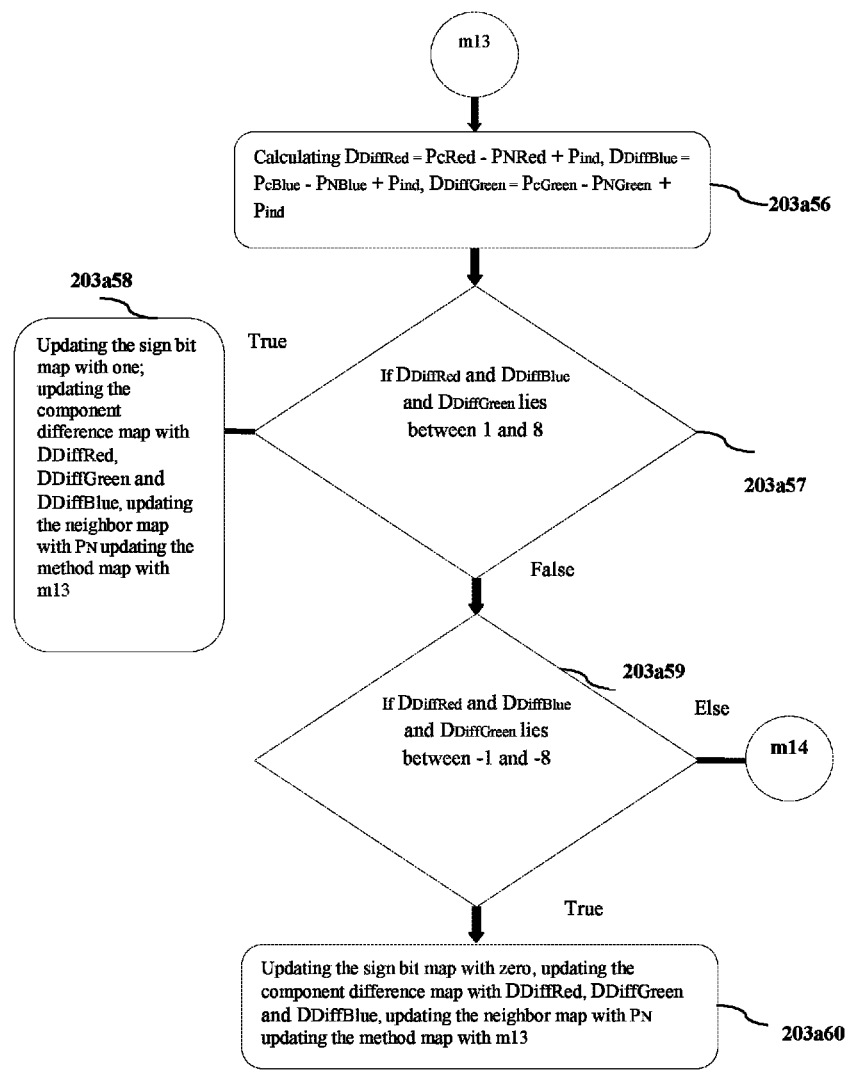
FIG. 2m illustrates the compression method $m_{13}$ of the present invention in detail for compressing the digital image in accordance to one embodiment of the present invention.

FIG. 2m illustrates the compression method $m_{13}$ of the present invention in detail for compressing the digital image in accordance to one embodiment of the present invention. The compression method $m_{13}$ for compressing a digital image further comprises the steps of calculating $D_{DiffRed}$, $D_{DiffGreen}$ and $D_{DiffBlue}$ in step 203a56, wherein:

$D_{DiffRed}=P_{cRed}-P_{NRed}+P_{ind}$;

$D_{DiffBlue}=P_{cBlue}-P_{NBlue}+P_{ind}$;

$D_{DiffGreen}=P_{cGreen}-P_{NGreen}+P_{ind}$.

Checking if $D_{DiffRed}$ and $D_{DiffBlue}$ and $D_{DiffGreen}$ lies between 1 and 8 in step 203a57 and then updating the sign bit map with one (here the sign bit map is updated with one to denote the difference in step 203a57 as positive), updating the component difference map with $D_{DiffRed}$, $D_{DiffBlue}$ and $D_{DiffGreen}$ and updating the method map with the corresponding method $m_{13}$ (binary value of method $m_{13}$ (1100) is added to the method map) in step 203a58. If the condition in step 203a57 holds false then further checking if $D_{DiffRed}$ and $D_{DiffBlue}$ and $D_{DiffGreen}$ lies between −1 and −8 in step 203a59 and then updating the the sign bit element with zero (here the sign bit map is updated with zero to denote the difference in step 203a59 as negative), updating the component difference map with $D_{DiffRed}$, $D_{DiffBlue}$ and $D_{DiffGreen}$ and updating the method map with the corresponding method $m_{13}$ (binary value of method $m_{13}$ (1100) is added to the method map) in step 203a60, else transferring the control to step 203a61 in FIG. 2n (here the control is transferred to step 203a61 to check if the RGB component of the pixel $P_c$ to be compressed is predictable using method $m_{14}$).

Figure 2N:
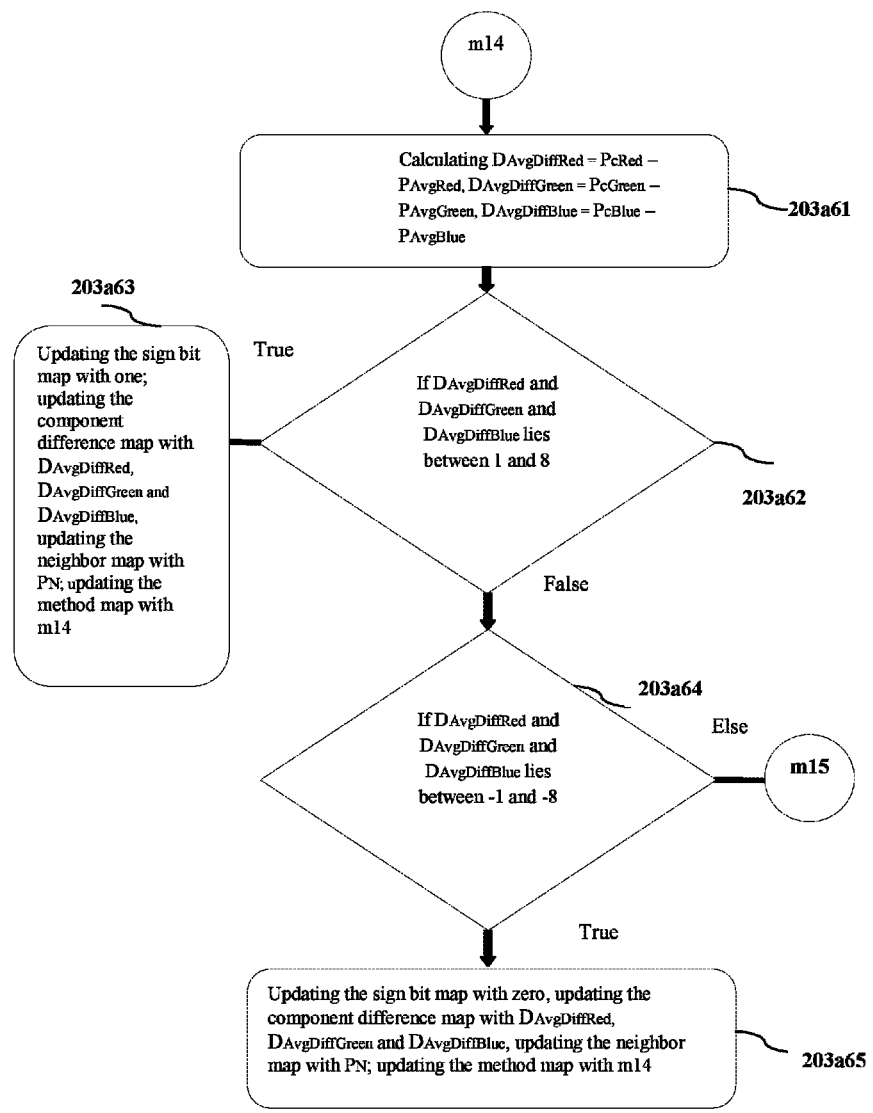
FIG. 2n illustrates the compression method $m_{14}$ of the present invention in detail for compressing the digital image in accordance to one embodiment of the present invention.

FIG. 2n illustrates the compression method $m_{14}$ of the present invention in detail for compressing the digital image in accordance to one embodiment of the present invention. The compression method $m_{14}$ for compressing a digital image further comprises the steps of calculating $D_{AvgDiffRed}$, $D_{AvgDiffGreen}$ and $D_{AvgDiffBlue}$ in step 203a61, wherein:

$D_{AvgDiffRed}=P_{cRed}-P_{AvgRed}$;

$D_{AvgDiffGreen}=P_{cGreen}-P_{AvgGreen}$;

$D_{AvgDiffBlue}=P_{cBlue}-P_{AvgBlue}$.

In step 203a62, checking if $D_{AvgDiffRed}$ and $D_{AvgDiffGreen}$ and $D_{AvgDiffBlue}$ lies between 1 and 8, then updating sign bit map with one (here the sign bit map is updated with one to denote the difference as positive), updating the component difference map with $D_{AvgDiffRed}$, $D_{AvgDiffGreen}$ and $D_{AvgDiffBlue}$, updating the neighbor map with the corresponding $P_N$, updating the method map with $m_{14}$ (binary value of method $m_{14}$ (1101) is added to the method map) in step 203a63. If the condition in step 203a62 holds false then checking if $D_{AvgDiffRed}$ and $D_{AvgDiffGreen}$ and $D_{AvgDiffBlue}$ lies between −1 and −8 in step 203a64 and updating sign bit map with zero (here the sign bit map is updated with zero to denote the difference as negative), updating the component difference map with $D_{AvgDiffRed}$, $D_{AvgDiffGreen}$ and $D_{AvgDiffBlue}$, updating the neighbor map with the corresponding $P_N$, updating the method map with $m_{14}$ (binary value of method $m_{14}$ (1101) is added to the method map) in step 203a65. Else transferring the control to step 203a66 in FIG. 2o (here the control is transferred to step 203a66 to check if the RGB component of the pixel $P_c$ to be compressed is predictable using method $m_{15}$).

Figure 2O:
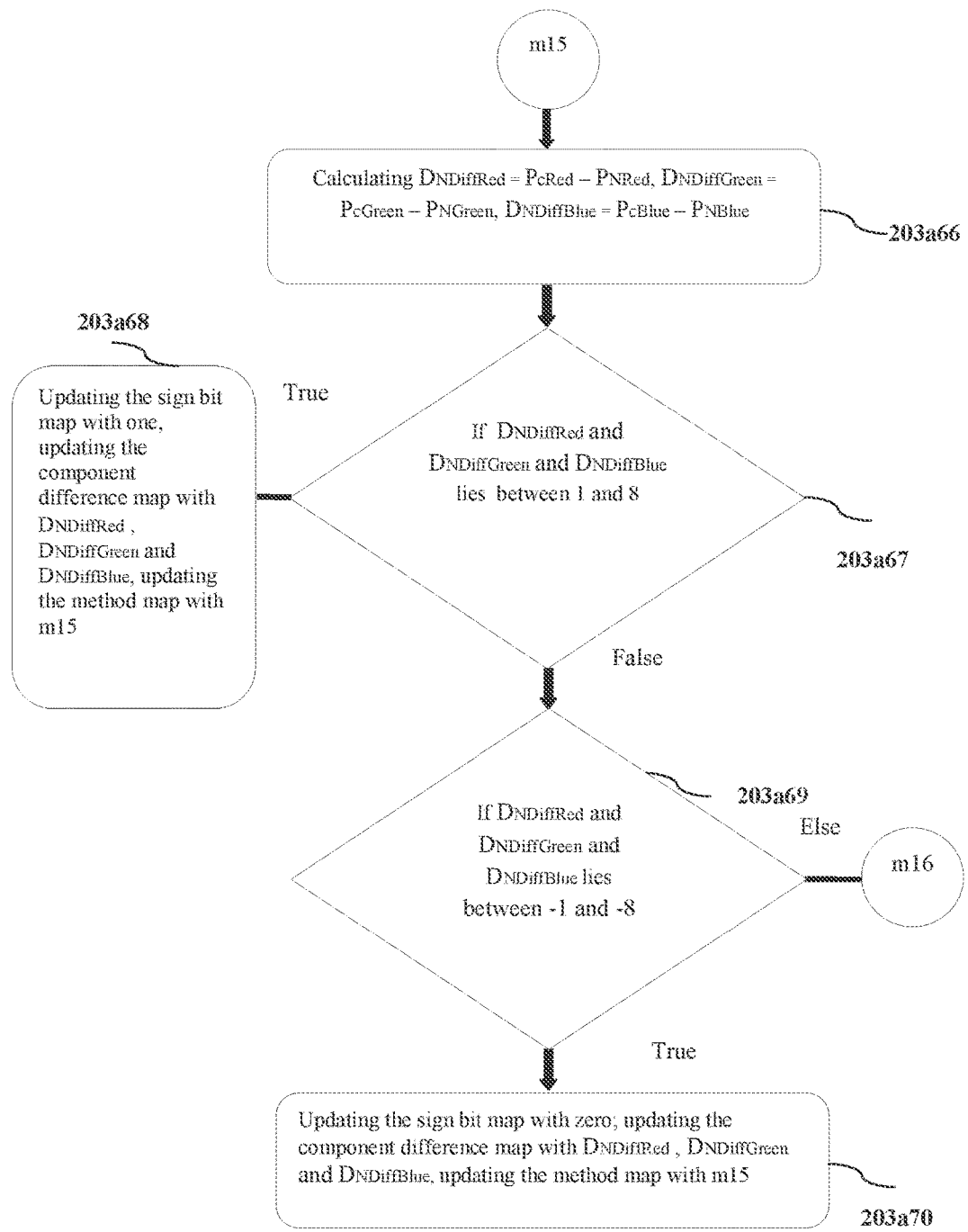
FIG. 2o illustrates the compression method $m_{15}$ of the present invention in detail for compressing the digital image in accordance to one embodiment of the present invention.

FIG. 2o illustrates the compression method $m_{15}$ of the present invention in detail for compressing the digital image in accordance to one embodiment of the present invention. The compression method $m_{15}$ for compressing a digital image further comprises the steps of calculating $D_{NDiffRed}$, $D_{NDiffGreen}$ and $D_{NDiffBlue}$ in step 203a66, wherein:

$D_{NDiffRed}=P_{cRed}-P_{NRed}$;

$D_{NDiffGreen}=P_{cGreen}-P_{NGreen}$;

$D_{NDiffBlue}=P_{cBlue}-P_{NBlue}$.

In step 203a67, checking if $D_{NDiffRed}$ and $D_{NDiffGreen}$ and $D_{NDiffBlue}$ lies between 1 and 8 and then updating the sign bit map with one (here the sign bit map is updated with one to denote the difference as positive), updating the component difference map with $D_{NDiffRed}$ and $D_{NDiffGreen}$ and $D_{NDiffBlue}$, updating the neighbor map with each Red, Green and Blue component of the neighboring pixel ($P_N$), updating the method map with method $m_{15}$ (binary value of method $m_{15}$ (1110) is added to the method map) in step 203a68. If the condition holds false in step 203a67, checking if $D_{NDiffRed}$ and $D_{NDiffGreen}$ and $D_{NDiffBlue}$ lies between −1 and −8 in step 203a69 then updating the sign bit element with zero (here the sigh bit map is updated with zero to denote the difference as positive), updating the component difference map with $D_{NDiffRed}$ and $D_{NDiffGreen}$ and $D_{NDiffBlue}$, updating the neighbor map with each Red, Green and Blue component of the neighboring pixel ($P_N$), updating the method map with method $m_{15}$ (binary value of method $m_{15}$ (1110) is added to the method map) in step 203a70. Else transferring the control to step 203a71 in FIG. 2p (here the control is transferred to step 203a71 to check if the RGB component of the pixel $P_c$ to be compressed is predictable using method $m_{16}$).

Figure 2P:
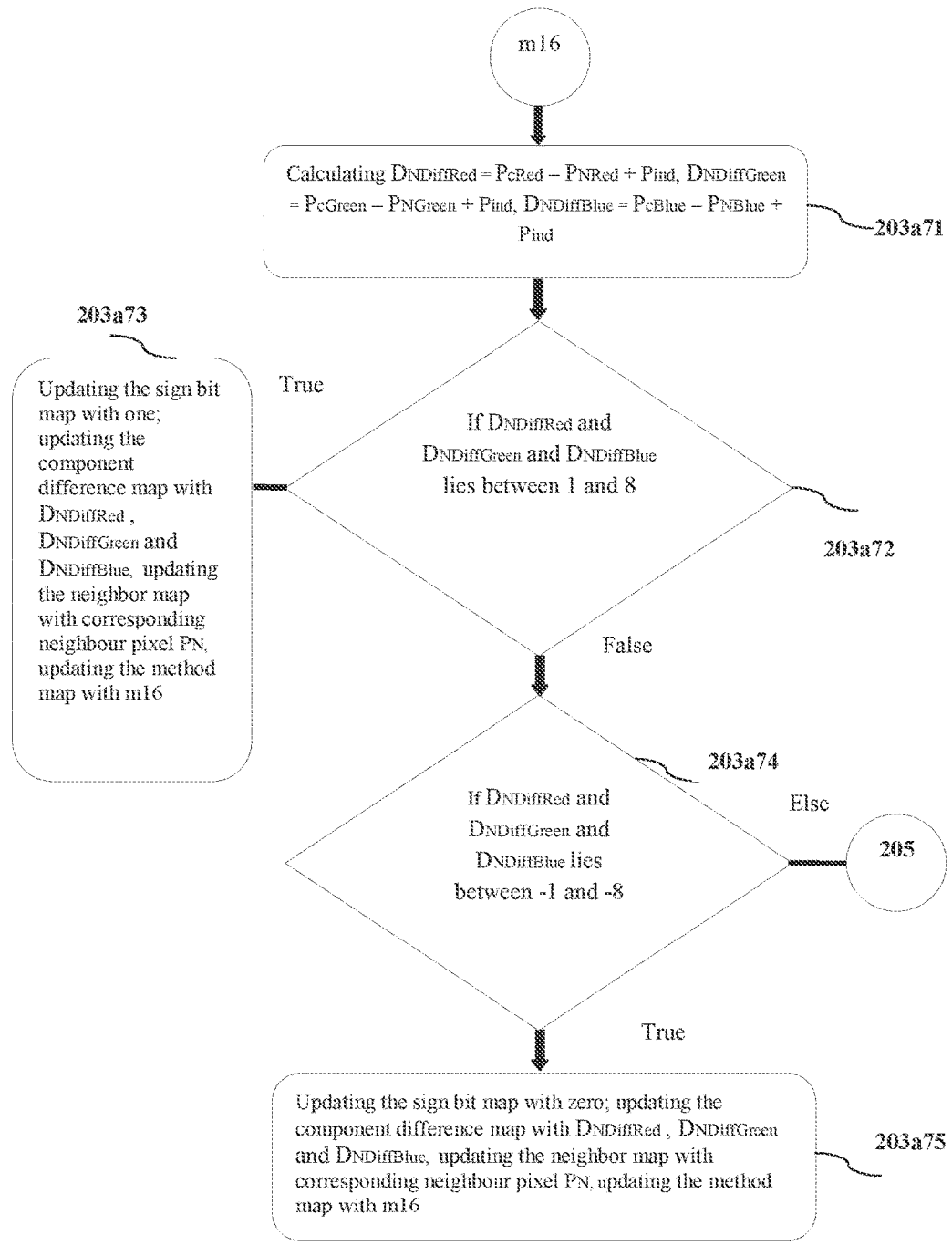
FIG. 2p illustrates the compression method $m_{16}$ of the present invention in detail for compressing the digital image in accordance to one embodiment of the present invention.
Figure 2:
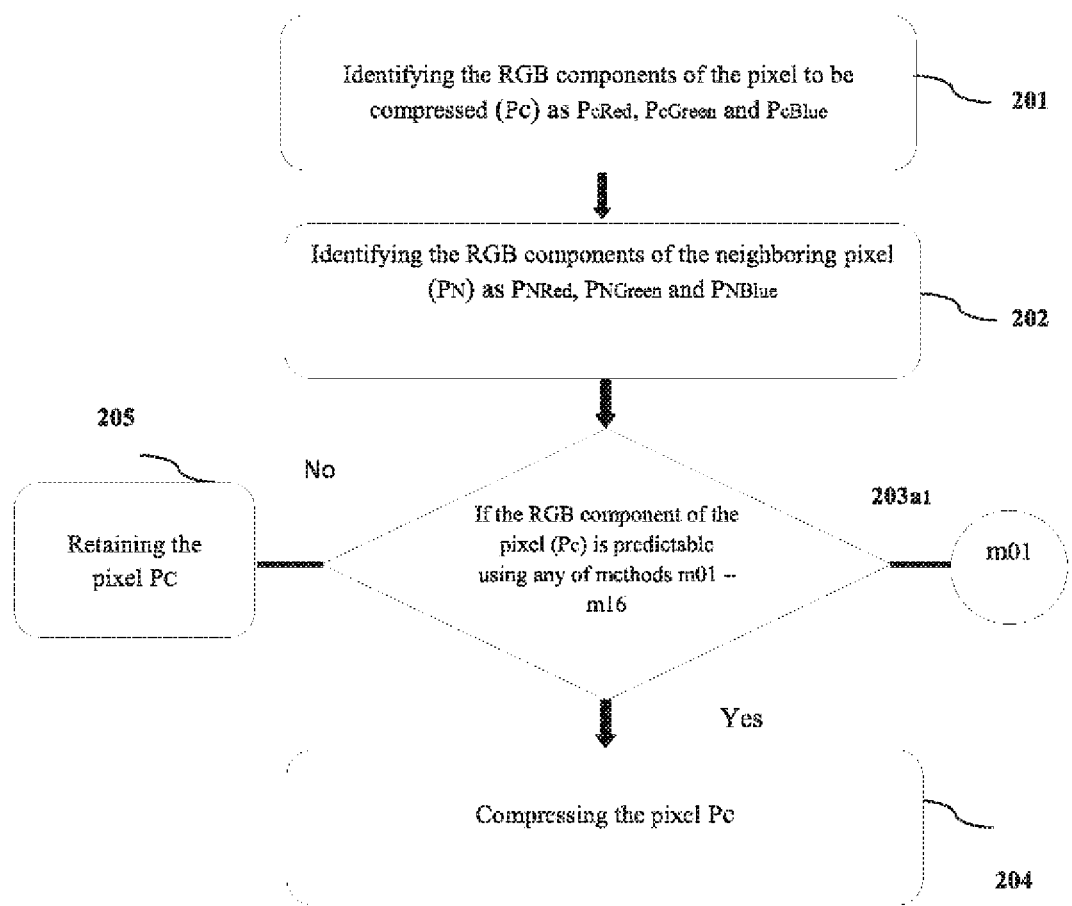

FIG. 2p illustrates the compression method $m_{16}$ of the present invention in detail for compressing the digital image in accordance to one embodiment of the present invention. The compression method $m_{16}$ for compressing a digital image further comprises the steps of calculating $D_{NDiffRed}$, $D_{NDiffGreen}$ and $D_{NDiffBlue}$ in step 203a71 as:

$$D_{NDiffRed} = P_{cRed} - P_{NRed} + P_{ind};$$

$$D_{NDiffGreen} = P_{cGreen} - P_{NGreen} + P_{ind};$$

$$D_{NDiffBlue} = P_{cBlue} - P_{NBlue} + P_{ind}.$$

Checking if $D_{NDiffRed}$ and $D_{NDiffGreen}$ and $D_{NDiffBlue}$ lies between 1 and 8 in step 203a72 and updating the sign bit map with one (here the sign bit map is updated with one to denote the difference as positive), updating the component difference map with $D_{NDiffRed}$, $D_{NDiffGreen}$ and $D_{NDiffBlue}$, updating the neighbor map with each Red, Green and Blue component of the neighboring pixel ($P_N$) and updating the method map with method $m_{16}$ (binary value of method $m_{16}$ (1111) is added to the method map) in step 203a73, if the condition in step 203a72 holds true. Else checking if $D_{NDiffRed}$ and $D_{NDiffGreen}$ and $D_{NDiffBlue}$ lies between $-1$ and $-8$ in step 203a74 and updating the sign bit element with zero (here the sign bit map is updated with one to denote the difference as negative), updating the component difference map with $D_{NDiffRed}$, $D_{NDiffGreen}$ and $D_{NDiffBlue}$, updating the neighbor map with each Red, Green and Blue component of the neighboring pixel ($P_N$), updating the method map with $m_{16}$ (binary value of method $m_{16}$ (1111) is added to the method map) in step 203a75. If the condition in step 203a74 also holds false, then the pixel ($P_c$) is retained as shown in step 205 in FIG. 2. Else if the RGB component of the pixel ($P_c$) to be compressed is predictable using any of the above method ($m_{01}$-$m_{16}$), the pixel ($P_c$) is compressed as shown in step 204 in FIG. 2.

In accordance to one embodiment of the invention, the method also comprises the steps of tracking the method id (if method $m_{01}$ is used for predicting $P_c$, then the method id is 01) of $P_c$ and comparing it with the method id of the previous pixel of $P_c$ and updating the previous method map to one, if the method id of $P_c$ and the previous pixel of $P_c$ are same else the previous method map is updated to zero.

Thus the system and method of the present invention overcomes the drawback of prior art by providing 100% numerically lossless reconstruction of the image as compared from its uncompressed source. Also the system and method of the present invention may be implemented in any of the industries such as entertainment industry with animation and live action requirement, defense, broadcasting, medical imaging, surveillance, astronomy, robotics and computer graphics to allow the end users to seamlessly playback video/hi-resolution image-frames without frame-count limitations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

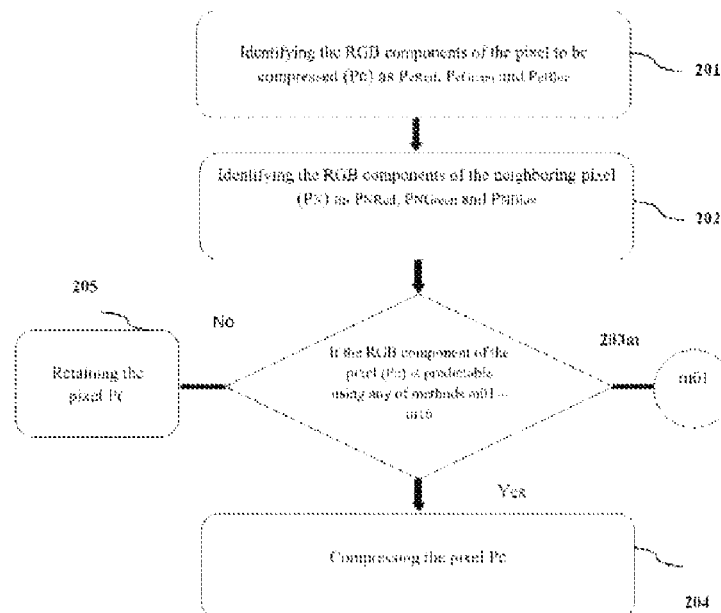

What is claimed is:

1. A method performed by a computer processor that compresses the raw Red-Green-Blue (RGB) data from a digital image comprises the steps of:
  a) receiving the digital image from a digital memory;
  b) identifying, in the received digital image, a pixel ($P_c$) to be compressed;
  c) identifying neighboring pixels ($P_N$) preceding the pixel ($P_c$) to be compressed;
  d) checking if the RGB component of the pixel ($P_c$) to be compressed is predictable using the RGB component of the neighboring pixels ($P_N$);
  e) determining whether the RGB component of the pixel ($P_c$) to be compressed is predictable using the RGB component of the neighboring pixels ($P_N$);
  f) if the RGB component of the pixel ($P_c$) to be compressed is determined to be predictable, then compressing the pixel ($P_c$) to be compressed and storing the compressed pixel in a compressed digital image;
  g) otherwise, retaining the pixel ($P_c$) and storing the retained pixel ($P_c$) in the compressed digital image;
  wherein determining whether the RGB component of the pixel ($P_c$) to be compressed is predictable comprises:
  (e)(1) identifying the RGB components of the pixel ($P_c$) to be compressed as $P_{cRed}$, $P_{cGreen}$ and $P_{cBlue}$ wherein:

$P_{cRed}$=red component of the pixel ($P_c$) to be compressed, $P_{cGreen}$=green component of the pixel ($P_c$) to be compressed, $P_{cBlue}$=blue component of the pixel ($P_c$) to be compressed;

(e)(2) identifying the RGB components of the neighboring pixels ($P_N$) to be compressed as $P_{NRed}$, $P_{NGreen}$ and $P_{NBlue}$ wherein:

$P_{NRed}$=red component of the neighboring pixel of ($P_c$) to be compressed, $P_{NGreen}$=green component of the neighboring pixel of ($P_c$) to be compressed, $P_{NBlue}$=blue component of the neighboring pixel of ($P_c$) to be compressed;

(e)(3) checking if the RGB components of the pixel ($P_c$) to be compressed is predictable using the RGB components of the neighboring pixels ($P_N$) by using the method $m_{01}$, wherein the method $m_{01}$ further comprises the steps of:
    checking if $P_{cRed}=P_{NRed}$ and $P_{cGreen}$=PNGreen and $P_{cBlue}=P_{NBlue}$ and the indices of the neighboring pixels ($P_N$) are equal, then
      updating the neighbor map with corresponding neighboring pixel ($P_N$);
      updating the method map with the corresponding method ($m_{01}$), else
  (e)(4) checking if the RGB components of the pixel ($P_c$) to be compressed is predictable using the RGB components of the neighboring pixels ($P_N$) by using method $m_{02}$, wherein the method $m_{02}$ further comprises the steps of:
    identifying $P_{AvgRed}$, $P_{avgGreen}$, $P_{avgBlue}$, $P_{ind}$ wherein:

$P_{avgRed}$=average of the red component of the neighboring pixels ($P_N$) and $P_{prevRed}$, wherein $P_{prevRed}$ is the red component of the previous pixel of ($P_N$) along the horizontal scan line, $P_{avgGreen}$=average of the green component of the neighboring pixels ($P_N$) and $P_{prevGreen}$, wherein $P_{prevGreen}$ is the green component of the previous pixel of ($P_N$) along the horizontal scanline, $P_{avgBlue}$=average of the blue component of the neighboring pixels ($P_N$) and $P_{prevBlue}$, wherein $P_{prevBlue}$ is the blue component of the previous pixel of ($P_N$) along the horizontal scanline, $P_{ind}$=index value of the neighboring pixels ($P_N$);
    checking if $P_{cRed}=P_{avgRed}+P_{ind}$, $P_{cGreen}=P_{avgGreen}+P_{ind}$ and $P_{cBlue}=P_{avgBlue}+P_{ind}$ and the indices of the neighboring pixels ($P_N$) are equal; then
      updating the sign bit map with one;
      updating the neighbor map with the corresponding neighboring pixel ($P_N$) and updating the method map with method ($m_{02}$), else
      checking if $P_{cRed}=P_{avgRed}-P_{ind}$, $P_{cGreen}=P_{avgGreen}-P_{ind}$ and $P_{cBlue}=P_{avgBlue}-P_{ind}$ and the indices of the neighboring pixels ($P_N$) are equal; then
      updating the sign bit map with zero;
      updating the neighbor map with the corresponding neighboring pixel ($P_N$) and updating the method map with method ($m_{02}$); else
  (e)(5) checking if the RGB components of the pixel ($P_c$) to be compressed is predictable using the RGB components of the neighboring pixels ($P_N$) by using method $m_{03}$, wherein the method $m_{03}$ further comprises the steps of:
    checking if $P_{cRed}=P_{NRed}+P_{ind}$ and $P_{cGreen}=P_{NGreen}+P_{ind}$ and $P_{cBlue}=P_{NBlue}+P_{ind}$ and the indices of the neighboring pixels ($P_N$) are equal, then
      updating the sign bit map with one;
      updating the neighbor map with the corresponding neighboring pixel ($P_N$) and updating the method map with method ($m_{03}$), else
    checking if $P_{cRed}=P_{NRed}-P_{ind}$ and $P_{cGreen}=P_{NGreen}-P_{ind}$ and $P_{cBlue}=P_{NBlue}-P_{ind}$ and the indices of the neighboring pixels ($P_N$) are equal; then
      updating the sign bit map with zero;
      updating the method map with method ($m_{03}$) and updating the neighbor map with the corresponding neighboring pixel ($P_N$), else
  (e)(6) checking if the RGB components of the pixel ($P_c$) to be compressed is predictable using the RGB components of the neighboring pixels ($P_N$) by using method $m_{04}$, wherein the method $m_{04}$ further comprises the steps of:
    identifying $P_{AvgRed}$, $P_{AvgGreen}$, $P_{AvgBlue}$;
    calculating $P_{DiffRed}$, $P_{DiffGreen}$ and $P_{DiffBlue}$, wherein:

$P_{DiffRed}=P_{NRed}-P_{prevRed}$, $P_{DiffGreen}=P_{NGreen}-P_{prevGreen}$, $P_{DiffBlue}=P_{NBlue}-P_{PrevBlue}$;

checking if $P_{cRed}=P_{AvgRed}+P_{DiffRed}$ and $P_{cGreen}=P_{AvgGreen}+P_{DiffGreen}$ and $P_{cBlue}=P_{AvgBlue}+P_{DiffBlue}$ and the indices of the neighboring pixels ($P_N$) are equal; then
      updating the sign bit map with one;
      updating the method map with method ($m_{04}$) and updating the neighbor map with the corresponding neighboring pixel ($P_N$), else
    checking if $P_{cRed}=P_{AvgRed}-P_{DiffRed}$ and $P_{cGreen}=P_{AvgGreen}-P_{DiffGreen}$ and $P_{cBlue}=P_{AvgBlue}-P_{DiffBlue}$ and the indices of the neighboring pixels ($P_N$) are equal; then updating the sign bit map with zero;
updating the method map with method ($m_{04}$) and updating the neighbor map with the corresponding neighboring pixel ($P_N$); else (e)(7) checking if the RGB components of the pixel ($P_c$) to be compressed is predictable using the RGB components of the neighboring pixels ($P_N$) by using method $m_{05}$, wherein the method $m_{05}$ further comprises the steps of:

checking if $P_{cRed}=P_{AvgRed}+P_{DiffRed}+P_{ind}$ and $P_{cGreen}=P_{AvgGreen}+P_{DiffGreen}+P_{ind}$ and $P_{cBlue}=P_{AvgBlue}+P_{DiffBlue}+P_{ind}$ and the indices of the neighboring pixels ($P_N$) are equal; then
updating the sign bit map with one;
updating the method map with method ($m_{05}$);
updating the neighbor map with the corresponding neighboring pixel ($P_N$), else checking if $P_{cRed}=P_{AvgRed}-P_{DiffRed}-P_{ind}$ and $P_{cGreen}=P_{AvgGreen}-P_{DiffGreen}-P_{ind}$ and $P_{cBlue}=P_{AvgBlue}-P_{DiffBlue}-P_{ind}$ and the indices of neighboring pixels ($P_N$) are equal, then
updating the sign bit map with zero;
updating the method map with method ($m_{05}$) and updating the neighbor map with the corresponding neighboring pixel ($P_N$); else (e)(8) checking if the RGB components of the pixel ($P_c$) to be compressed is predictable using the RGB components of the neighboring pixels ($P_N$) by using method $m_{06}$, wherein the method $m_{06}$ further comprises the steps of:

calculating $D_{NRed}$, $D_{NGreen}$ and $D_{NBlue}$, wherein:

$$D_{NRed}=P_{cRed}-P_{NRed},$$

$$D_{NGreen}=P_{cGreen}-P_{NGreen},$$

$$D_{NBlue}=P_{cBlue}-P_{NBlue};$$

checking if $D_{NRed}=D_{NGreen}$ and $D_{NRed}=D_{NBlue}$ and the value of $D_{NRed}$ lies between 1 and 8; then
updating the sign bit map with one;
updating the component difference map with $D_{NRed}$;
updating the neighbor map with the corresponding neighboring pixel ($P_N$) and updating the method map with method ($m_{06}$), else
checking if $D_{NRed}=D_{NGreen}$ and $D_{NRed}=D_{NBlue}$ and the value of $D_{NRed}$ lies between −1 and −8; then
updating the sign bit map with zero;
updating the component difference map with $D_{NRed}$;
updating the neighbor map with the corresponding neighboring pixel ($P_N$) and updating the method map with method ($m_{06}$), else (e)(9) checking if the RGB components of the pixel ($P_c$) to be compressed is predictable using the RGB components of the neighboring pixels ($P_N$) by using method $m_{07}$, wherein the method $m_{07}$ comprises the steps of:
calculating $D_{NRed}$, $D_{NGreen}$ and $D_{NBlue}$ wherein:

$$D_{NRed}=P_{cRed}-P_{AvgRed}+P_{ind},$$

$$D_{NGreen}=P_{cGreen}-P_{AvgGreen}+P_{ind},$$

$$D_{NBlue}=P_{cBlue}-P_{AvgBlue}+P_{ind};$$

checking if $D_{NRed}=D_{NGreen}$ and $D_{NRed}=D_{NBlue}$ and the value of $D_{NRed}$ lies between 1 and 8;
updating the sign bit map with one;
updating the component difference map with $D_{NRed}$;
updating the neighbor map with the corresponding neighboring pixel ($P_N$) and updating the method map with method ($m_{07}$); or else
checking if $D_{NRed}=D_{NGreen}$ and $D_{NRed}=D_{NBlue}$ and the value of $D_{NRed}$ lies between −1 and −8;
updating the sign bit map with zero;
updating the component difference map with $D_{NRed}$;
updating the neighbor map with the corresponding neighboring pixel ($P_N$) and updating the method map with method ($m_{07}$), else (e)(10) checking if the RGB components of the pixel ($P_c$) to be compressed is predictable using the RGB components of the neighboring pixels ($P_N$) by using method $m_{08}$, wherein the method $m_{08}$ further comprises the steps of:
identifying $P_{PrevRed}$, $P_{PrevGreen}$ and $P_{PrevBlue}$ wherein:

$P_{PrevRed}$=red component of the previous pixel of $P_N$ along the horizontal scanline, $P_{PrevGreen}$=green component of the previous pixel of $P_N$ along the horizontal scanline, $P_{PrevBlue}$=blue component of the previous pixel of $P_N$ along the horizontal scanline;

checking if $P_{cRed}=P_{PrevRed}+P_{ind}$ and $P_{cGreen}=P_{PrevGreen}+P_{ind}$ and $P_{cBlue}=P_{PrevBlue}+P_{ind}$ and the indices of the neighboring pixels ($P_N$) are not equal; then
updating the sign bit map with one;
updating the neighbor map with the corresponding neighboring pixel ($P_N$) for each Red, Green and Blue component;
updating the method map with method $m_{08}$, else
checking if $P_{cRed}=P_{PrevRed}-P_{ind}$ and $P_{cGreen}=P_{PrevGreen}-P_{ind}$ and $P_{cBlue}=P_{PrevBlue}-P_{ind}$ and the indices of the neighboring pixels ($P_N$) are not equal;
updating the sign bit map with zero;
updating the neighbor map with the corresponding neighboring pixel ($P_N$) for each Red, Green and Blue component;
updating the method map with method $m_{08}$, else (e)(11) checking if the RGB components of the pixel ($P_c$) to be compressed is predictable using the RGB components of the neighboring pixels ($P_N$) by using method $m_{09}$, wherein the method $m_{09}$ further comprises the steps of:
checking if $P_{cRed}=P_{PrevRed}+P_{ind}+P_{DiffRed}$ and $P_{cGreen}=P_{PrevGreen}+P_{ind}+P_{DiffGreen}$ and $P_{cBlue}=P_{PrevBlue}+P_{ind}+P_{DiffBlue}$ and the indices of the neighboring pixels ($P_N$) are not equal then;
updating the sign bit map with one;
updating the neighbor map with the corresponding neighboring pixel ($P_N$) for each Red, Green and Blue component;
updating the method map with method $m_{09}$; or else
checking if $P_{cRed}=P_{PrevRed}-P_{ind}-P_{DiffRed}$ and $P_{cGreen}=P_{PrevGreen}-P_{ind}-P_{DiffGreen}$ and $P_{cBlue}=P_{PrevBlue}-P_{ind}-P_{DiffBlue}$ and the indices of the neighboring pixels ($P_N$) are not equal then;
updating the sign bit map with zero;
updating the neighbor map with the corresponding neighboring pixel ($P_N$) for each Red, Green and Blue component;
updating the method map with method $m_{09}$; else (e)(12) checking if the RGB components of the pixel ($P_c$) to be compressed is predictable using the RGB components of the neighboring pixels ($P_N$) by using method $m_{10}$, wherein the method $m_{10}$ further comprises the steps of:
checking if $P_{cRed}=P_{NRed}+P_{ind}$ and $P_{cGreen}=P_{NGreen}+P_{ind}$ and $P_{cBlue}=P_{NBlue}+P_{ind}$ and the indices of the neighboring pixels ($P_N$) are not equal then;
updating the sign bit map with one;
updating the neighbor map with the corresponding neighboring pixel ($P_N$) for each Red, Green and Blue component;
updating the method map with method $m_{10}$, or else
checking if $P_{cRed}=P_{NRed}-P_{ind}$ and $P_{cGreen}=P_{NGreen}-P_{ind}$ and $P_{cBlue}=P_{NBlue}-P_{ind}$ and the indices of the neighboring pixels ($P_N$) are not equal then;
updating the sign bit map with zero;
updating the neighbor map with the corresponding neighboring pixel ($P_N$) for each Red, Green and Blue component;
updating the method map with method $m_{10}$, else
(e)(13) checking if the RGB components of the pixel ($P_c$) to be compressed is predictable using the RGB components of the neighboring pixels ($P_N$) by using method $m_{11}$, wherein the method $m_{11}$ further comprises the steps of:
identifying $P_{NPrevRed}$, $P_{NPrevGreen}$ and $P_{NPrevBlue}$ wherein:

$$P_{NPrevRed}=P_{(NRed-Pind)},$$

$$P_{NPrevGreen}=P_{(NGreen-Pind)},$$

$$P_{NPrevBlue}=P_{(NBlue-Pind)};$$

checking if $P_{cRed}=P_{NPrevRed}+P_{ind}$ and $P_{cGreen}=P_{NPrevGreen}+P_{ind}$ and $P_{cBlue}=P_{NPrevBlue}+P_{ind}$ and the indices of the neighboring pixels ($P_N$) are not equal then;
updating the sign bit map with one;
updating the neighbor map with the corresponding neighboring pixel ($P_N$) for each Red, Green and Blue component;
updating the method map with method $m_{11}$, else
checking if $P_{cRed}=P_{NPrevRed}-P_{ind}$ and $P_{CGreen}=P_{NPrevGreen}-P_{ind}$ and $P_{cBlue}=P_{NPrevBlue}-P_{ind}$ and the indices of the neighboring pixels ($P_N$) are not equal then;
updating the sign bit map with zero;
updating the neighbor map with the corresponding neighboring pixel ($P_N$) for each Red, Green and Blue component;
updating the method map with method $m_{11}$; else
(e)(14) checking if the RGB components of the pixel ($P_c$) to be compressed is predictable using the RGB components of the neighboring pixels ($P_N$) by using method $m_{12}$, wherein the method $m_{12}$ further comprises the steps of:
identifying $P_{CPrevred}$, $P_{CPrevgreen}$, $P_{CPrevblue}$ wherein:

$P_{CPrevred}$=red component of the previous pixel of $P_c$, $P_{CPrevgreen}$=green component of the previous pixel of $P_c$, $P_{CPrevblue}$=blue component of the previous pixel of $P_c$;

calculating $D_{CPrevDiffRed}$, $D_{CPrevDiffBlue}$ and $D_{CPrevDiffGreen}$ wherein:

$$D_{CPrevDiffRed}=P_{cRed}-P_{cPrevred},$$

$$D_{CPrevDiffBlue}=P_{cBlue}-P_{cPrevblue},$$

$$D_{CPrevDiffGreen}=P_{cGreen}-P_{cPrevGreen};$$

checking if $D_{CPrevDiffRed}$, $D_{CPrevDiffBlue}$ and $D_{CPrevDiffGreen}$ lies between 1 and 8; then
updating the sign bit map with one;
updating the component difference map with $D_{CPrevDiffRed}$, $DC_{PrevDiffBlue}$ and $D_{CPrevDiffGreen}$;
updating the method map with method $m_{12}$, or else
checking if $D_{CPrevDiffRed}$, $D_{CPrevDiffBlue}$ and $D_{CPrevDiffGreen}$ lies between −1 and −8 then
updating the sign bit map with zero;
updating the component difference map with $D_{CPrevDiffRed}$, $DC_{PrevDiffBlue}$ and $D_{CPrevDiffGreen}$;
updating the method map with method $m_{12}$, else
(e)(15) checking if the RGB components of the pixel ($P_c$) to be compressed is predictable using the RGB components of the neighboring pixels ($P_N$) by using method $m_{13}$, wherein the method $m_{13}$ further comprises the steps of:
calculating $D_{DiffRed}$, $D_{DiffGreen}$ and $D_{DiffBlue}$, wherein:

$$D_{DiffRed}=P_{cRed}-P_{NRed}+P_{ind},$$

$$D_{DiffBlue}=P_{cBlue}-P_{NBlue}+P_{ind},$$

$$D_{DiffGreen}=P_{cGreen}-P_{NGreen}+P_{ind};$$

checking if $D_{DiffRed}$, $D_{DiffBlue}$ and $D_{DiffGreen}$ lies between 1 and 8;
updating the sign bit map with one;
updating the component difference map with $D_{DiffRed}$, $D_{DiffBlue}$ and $D_{DiffGreen}$;
updating the neighbor map with the corresponding neighbor pixel ($P_N$);
updating the method map with the corresponding method $m_{13}$, else
checking if $D_{DiffRed}$, $D_{DiffBlue}$ and $D_{DiffGreen}$ lies between −1 and −8;
updating the sign bit element with zero;
updating the component difference map with $D_{DiffRed}$, $D_{DiffBlue}$ and $D_{DiffGreen}$;
updating the neighbor map with the corresponding neighbor pixel ($P_N$);
updating the method map with the corresponding method $m_{13}$, else
(e)(16) checking if the RGB components of the pixel ($P_c$) to be compressed is predictable using the RGB components of the neighboring pixels ($P_N$) by using method $m_{14}$, wherein the method $m_{14}$ further comprises the steps of:
calculating $D_{AvgDiffRed}$, $D_{AvgDiffGreen}$ and $D_{AvgDiffBlue}$, wherein:

$$D_{AvgDiffRed}=P_{cRed}-P_{AvgRed},$$

$$D_{AvgDiffGreen}=P_{cGreen}-P_{AvgGreen},$$

$$D_{AvgDiffBlue}=P_{cBlue}-P_{AvgBlue};$$

checking if $D_{AvgDiffRed}$ and $D_{AvgDiffGreen}$ and $D_{AvgDiffBlue}$ lies between 1 and 8;
updating the sign bit map with one;
updating the component difference map with $D_{AvgDiffRed}$, $D_{AvgDiffGreen}$ and $D_{AvgDiffBlue}$;

updating the neighbor map with the corresponding neighboring pixel ($P_N$);
updating the method map with method $m_{14}$, else checking if $D_{AvgDiffRed}$ and $D_{AvgDiffGreen}$ and $D_{AvgDiffBlue}$ lies between −1 and −8;
updating the sign bit element with zero;
updating the component difference map with $D_{AvgDiffRed}$, $D_{AvgDiffGreen}$ and $D_{AvgDiffBlue}$;
updating the neighbor map with corresponding neighboring pixel ($P_N$);
updating the method map with method $m_{14}$, else (e)(17) checking if the RGB components of the pixel ($P_c$) to be compressed is predictable using the RGB components of the neighboring pixels ($P_N$) by using method $m_{15}$, wherein the method $m_{15}$ further comprises the steps of:
calculating $D_{NDiffRed}$, $D_{NDiffGreen}$ and $D_{NDiffBlue}$, wherein:

$$D_{NDiffRed} = P_{cRed} - P_{NRed},$$

$$D_{NDiffGreen} = P_{cGreen} - P_{NGreen},$$

$$D_{NDiffBlue} = P_{cBlue} - P_{NBlue};$$

checking if $D_{NDiffRed}$ and $D_{NDiffGreen}$ and $D_{NDiffBlue}$ lies between 1 and 8;
updating the sign bit map with one;
updating the component difference map with $D_{NDiffRed}$ and $D_{NDiffGreen}$ and $D_{NDiffBlue}$;
updating the neighbor map with the corresponding neighboring pixel ($P_N$) for each Red, Green and Blue component;
updating the method map with method $m_{15}$; or else checking if $D_{NDiffRed}$ and $D_{NDiffGreen}$ and $D_{NDiffBlue}$ lies between −1 and −8;
updating the sign bit map with zero;
updating the component difference map with $D_{NDiffRed}$ and $D_{NDiffGreen}$ and $D_{NDiffBlue}$;
updating the neighbor map with the corresponding neighboring pixel ($P_N$) for each Red, Green and Blue component;
updating the method map with method $m_{15}$, else (e)(18) checking if the RGB components of the pixel ($P_c$) to be compressed is predictable using the RGB components of the neighboring pixels ($P_N$) by using method $m_{16}$, wherein the method $m_{16}$ further comprises the steps of:
calculating $D_{NDiffRed}$, $D_{NDiffGreen}$ and $D_{NDiffBlue}$ as:

$$D_{NDiffRed} = P_{cRed} - P_{NRed} + P_{ind},$$

$$D_{NDiffGreen} = P_{cGreen} - P_{NGreen} + P_{ind},$$

$$D_{NDiffBlue} = P_{cBlue} - P_{NBlue} + P_{ind};$$

checking if $D_{NDiffRed}$ and $D_{NDiffGreen}$ and $D_{NDiffBlue}$ lies between 1 and 8;
updating the sign bit map with one;
updating the component difference map with $D_{NDiffRed}$, $D_{NDiffGreen}$ and $D_{NDiffBlue}$;
updating the neighbor map with the corresponding neighboring pixel ($P_N$) for each Red, Green and Blue component;
updating the method map with method ($m_{16}$), else checking if $D_{NDiffRed}$ and $D_{NDiffGreen}$ and $D_{NDiffBlue}$ lies between −1 and −8;
updating the sign bit element with zero;
updating the component difference map with $D_{NDiffRed}$, $D_{NDiffGreen}$ and $D_{NDiffBlue}$;
updating the neighbor map with the corresponding neighboring pixel ($P_N$) for each Red, Green and Blue component;
updating the method map with method ($m_{16}$).

2. The method as claimed in claim 1, wherein the method provides lossless reconstruction of the image when applied to a digital image.

3. The method as claimed in claim 1, wherein the RGB component of the pixel ($P_c$) to be compressed is predictable using the RGB component of the neighboring pixels ($P_N$) by using any one of the methods ($m_{01}$-$m_{16}$).

4. The method as claimed in claim 1, wherein the method further comprises the steps of updating the compression map with one, if the RGB component of the pixel ($P_c$) to be compressed is predictable using any one of the methods ($m_{01}$-$m_{16}$), else updating the compression map with zero.

5. The method as claimed in claim 1, wherein the neighboring pixels (PN) are taken within a cycle of four reference neighboring pixels preceding the pixel (Pc) to be compressed.

6. The method as claimed in claim 1, wherein the neighbor map is the bit wise binary representation of each neighboring pixel 'PN' that is used for predicting the RGB component of the pixel 'Pc' to be compressed.

7. The method as claimed in claim 1, wherein the method map is the bit wise binary representation of method (m01-m16) denoting how each pixel Pc to be compressed is related to its neighboring pixel 'PN'.

8. The method as claimed in claim 1, wherein the sign bit map is the bit wise binary representation of the difference between the comparisons used in method (m01-m16).

9. The method as claimed in claim 1, wherein the component difference map is the bit wise binary representation of the difference between the RGB components of the pixel ($P_c$) to be compressed and the RGB components of the neighboring pixels ($P_N$).

10. The method as claimed in claim 1, wherein the method is implemented in a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television or a home entertainment system.

* * * * *

UNITED STATES PATENT AND TRADEMARK OFFICE
CERTIFICATE OF CORRECTION

| | | |
|---|---|---|
| PATENT NO. | : 9,571,839 B2 | |
| APPLICATION NO. | : 15/068966 | |
| DATED | : February 14, 2017 | |
| INVENTOR(S) | : Rejoy Alexander | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIG. 2 with FIG. 2 as shown on the attached page.

In the Specification

In Column 3, Line 27, delete "('$P_1$," and insert -- ($P_1$, --, therefor.

In Column 7, Line 24, delete "203$a_{20}$) in step 203$a_{20}$" and insert -- 203a20) in step 203a20 --, therefor.

In the Claims

In Column 15, Line 51, in Claim 1, delete "=PNGreen" and insert -- =$P_{NGreen}$ --, therefor.

In Column 20, Line 13, in Claim 1, delete "$D_{CPrevDiffBlue}$" and insert -- $D_{CPrevDiffBlue}$ --, therefor.

In Column 20, Line 19, in Claim 1, delete "$D_{CPrevDiffBlue}$" and insert -- $D_{CPrevDiffBlue}$ --, therefor.

In Column 20, Line 38, in Claim 1, delete "($P_N$);" and insert -- ($P_N$); --, therefor.

In Column 20, Line 47, in Claim 1, delete "($P_N$);" and insert -- ($P_N$); --, therefor.

In Column 21, Line 2, in Claim 1, delete "($P_N$);" and insert -- ($P_N$); --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,571,839 B2

In Column 21, Line 10, in Claim 1, delete "($P_{N)}$;" and insert -- ($P_N$); --, therefor.

In Column 22, Line 15, in Claim 1, delete "($m_{16)}$." and insert -- ($m_{16}$). --, therefor.

In Column 22, Line 29, in Claim 5, delete "(PN)" and insert -- ($P_N$) --, therefor.

In Column 22, Line 30, in Claim 5, delete "(Pc)" and insert -- ($P_c$) --, therefor.

In Column 22, Line 34, in Claim 6, delete "'PN'" and insert -- '$P_N$' --, therefor.

In Column 22, Line 35, in Claim 6, delete "'Pc'" and insert -- '$P_c$' --, therefor.

In Column 22, Lines 37-38, in Claim 7, delete "(m01-m16)" and insert -- ($m_{01}$-$m_{16}$) --, therefor.

In Column 22, Line 38, in Claim 7, delete "Pc" and insert -- $P_c$ --, therefor.

In Column 22, Line 39, in Claim 7, delete "'PN'." and insert -- '$P_N$'. --, therefor.

In Column 22, Line 42, in Claim 8, delete "(m01-m16)." and insert -- ($m_{01}$-$m_{16}$). --, therefor.

In Column 22, Line 46, in Claim 9, delete "($P_{N)}$." and insert -- ($P_N$). --, therefor.

(12) United States Patent
Alexander

(10) Patent No.: US 9,571,839 B2
(45) Date of Patent: Feb. 14, 2017

(54) IMAGE COMPRESSION AND LOSSLESS RECONSTRUCTION OF DIGITAL IMAGE

(71) Applicant: Brainwave Innovations Private Limited, Bangalore, Karnataka (IN)

(72) Inventor: Rejoy Alexander, Bangalore (IN)

(73) Assignee: Brainwave Innovations Private Limited (IN)

(*) Notice: Subject to any disclaimer, the term of this patent is extended or adjusted under 35 U.S.C. 154(b) by 0 days.

(21) Appl. No.: 15/068,966

(22) Filed: Mar. 14, 2016

(65) Prior Publication Data
US 2016/0198155 A1 Jul. 7, 2016

Related U.S. Application Data

(63) Continuation of application No. 13/890,535, filed on May 9, 2013, now abandoned.

(30) Foreign Application Priority Data

Jan. 17, 2013 (IN) .................. 233/CHE/2013

(51) Int. Cl.
*H04N 19/11* (2014.01)
*H04N 19/593* (2014.01)
*G06T 9/00* (2006.01)

(52) U.S. Cl.
CPC ............. *H04N 19/11* (2014.11); *G06T 9/004* (2013.01); *H04N 19/593* (2014.11)

(58) Field of Classification Search
CPC .................................................. H04N 19/11
USPC .................................................. 375/240.01
See application file for complete search history.

(56) References Cited

U.S. PATENT DOCUMENTS

2006/0262982 A1* 11/2006 Matsumoto ......... H04N 19/93
382/238
2011/0090956 A1* 4/2011 Youn ................. H03M 7/4006
375/240.12

* cited by examiner

*Primary Examiner* — Yulin Sun
(74) *Attorney, Agent, or Firm* — Robert Plotkin, P.C.; Robert Plotkin

(57) ABSTRACT

The present invention is related to a system and method that provides 100% numerically lossless reconstruction of the image as compared from its uncompressed source. The method of the present invention is configured to compress the raw Red-Green-Blue (RGB) data from a digital image stored on a device and the method further comprises the steps of compressing the pixel ($P_c$) only if the RGB component of the pixel ($P_c$) to be compressed is predictable using the RGB component of the neighboring pixels ($P_N$) by using the methods ($m_{01}$-$m_{16}$) else the pixel ($P_c$) is retained.

10 Claims, 18 Drawing Sheets